(12) United States Patent
Uchida et al.

(10) Patent No.: US 8,797,570 B2
(45) Date of Patent: Aug. 5, 2014

(54) IMAGE TRANSMISSION APPARATUS

(75) Inventors: Hisashi Uchida, Kyoto (JP); Kazuo Inui, Itami (JP); Tomo Tsuboi, Itami (JP); Hideki Hino, Matsuyama (JP); Ayumi Itoh, Nara-ken (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 2074 days.

(21) Appl. No.: 11/847,777

(22) Filed: Aug. 30, 2007

(65) Prior Publication Data
US 2008/0055659 A1    Mar. 6, 2008

(30) Foreign Application Priority Data

Aug. 31, 2006 (JP) .................................. 2006-235525

(51) Int. Cl.
*G06F 3/12* (2006.01)
*H04N 1/00* (2006.01)

(52) U.S. Cl.
USPC ......................................... 358/1.15; 358/400

(58) Field of Classification Search
CPC .......... H04N 1/32037; H04N 1/00212; H04N 1/32106; H04N 2201/3276
USPC ................................ 358/1.13, 1.14, 1.15, 402
See application file for complete search history.

(56) References Cited

U.S. PATENT DOCUMENTS

| | | | |
|---|---|---|---|
| 2003/0081234 A1* | 5/2003 | Wiley | 358/1.13 |
| 2006/0274367 A1* | 12/2006 | Yamamoto et al. | 358/1.15 |
| 2007/0011198 A1* | 1/2007 | Fukui et al. | 707/104.1 |

FOREIGN PATENT DOCUMENTS

| | | | | |
|---|---|---|---|---|
| JP | 9-214718 A | 8/1997 | | |
| JP | 11-298516 | 10/1999 | | |
| JP | 11298516 A | * 10/1999 | ............. | H04L 12/54 |
| JP | 2002-044357 A | 2/2002 | | |
| JP | 2003-264667 | 9/2003 | | |
| JP | 2003-283745 A | 10/2003 | | |
| JP | 2005-039411 | 2/2005 | | |

OTHER PUBLICATIONS

Notification of Reasons for Refusal in JP 2006-235525 dated Aug. 12, 2008, in English Language Translation.

\* cited by examiner

*Primary Examiner* — David Moore
*Assistant Examiner* — Neil R McLean
(74) *Attorney, Agent, or Firm* — Buchanan Ingersoll & Rooney PC

(57) ABSTRACT

A transmission-side MFP receives a user name, checks whether the user name is registered in a destination user list, and if so, transmits image data to a reception-side MFP. If an ACK is received, the transmission-side MFP displays that transmission was successful. When a NACK is received or a time out occurs, the transmission-side MFP checks whether the user name is registered in an individual address book, and if so, transmits the image data using a corresponding transmission method. If an ACK is received, the transmission-side MFP displays that transmission was successful. If a timeout occurs, the transmission-side MFP displays that transmission failed.

22 Claims, 22 Drawing Sheets

FIG. 20

```
TRANSMISSION REPORT

SUBJECT: COULD NOT TRANSMIT TO HOME MFP
SENDER: PERSON C
DESTINATION: PERSON A

1.  COULD NOT TRANSMIT FILE (20060426112233.pdf)
    TO HOME MFP OF PERSON A
2.  TRANSMITTED FILE (20060426112233.pdf)
    TO E-MAIL ADDRESS OF PERSON A
```

FIG. 23

```
SELECT DESTINATION OF FILE (20060426112233.pdf)

▲   PERSON A    [MFP101]    [personA@abcdefg.com]

PERSON B    [MFP102]

PERSON C                [personC@abcdefg.com]

▼   PERSON D    [MFP101]    [personD@abcdefg.com]
```

IMAGE TRANSMISSION APPARATUS

CROSS-REFERENCE TO RELATED APPLICATIONS

This application is based on application No. 2006-235525 filed in Japan, the content of which is hereby incorporated by reference.

BACKGROUND OF THE INVENTION (1) Field of the Invention

The present invention relates to an image transmission apparatus, and in particular to a technique for improving convenience for the user when transmitting image data.

(2) Description of the Related Art

With significant progress in information communication techniques in recent years, it is now possible to select from among various communication methods such as e-mail, FTP (File Transfer Protocol) and SMB (Server Message Block), in addition to facsimile. Accordingly, MFPs (Multi Function Peripherals) are equipped with functions that enable various methods to be used for transmitting and receiving image data obtained by reading a document with a scanner.

It is the sender who determines which of the communication functions included in the MFP to use to transmit image data. Therefore, unless the sender pays any particular caution to the convenience of the receiver, there is no allowance for the convenience of the receiver. For instance, it may be the receiver's preference to save received image data as an electronic file, rather than printing it, due to large amounts of image data being received from numerous sources. However, if the sender transmits image data by facsimile, it will be printed regardless of the receiver's wishes.

In response to this kind of problem, an MFP has been proposed that enables the receiver to designate whether received image data is to be printed, to be stored as an electronic file, or to be transferred to another apparatus. Using this kind of MFP means that received image data can be processed in the manner designated by the receiver, regardless of which communication method was used. In addition, the sender does not need to take the convenience of the receiver into consideration.

A further problem is that transmission of image data may fail for reasons such as the state of the MFP on the reception side. The present inventors focused on the fact that in such a case the image data may be able to be transmitted without failure if an attempt is made to transmit the image data via another transmission path or by using another transmission method. However, whichever communication method is used, it is usually necessary to input a sequence of ten or more letters and/or numbers in order to designate a new transmission destination for the image data. For instance, in the case of a facsimile, it is necessary to input a fax number, while in the case of an e-mail, it is necessary to input an e-mail address, and in the case of FTP, it is necessary to input an FTP server address.

When there is a relatively large number of destinations to which image data is to be transmitted, it is not just having to store each of the numerous destinations that is inconvenient and even extremely tedious for the user, but also having to input such destinations. There are also problems such as image data being transmitted to the wrong destination. To this end, a technique has been disclosed for pre-storing a plurality of transmission destinations and transmission methods with respect to a single party in a destination information storage part, and determining one from amongst the plurality.

This provides improved convenience for the user when transmitting image data, as well as avoiding problems such as transmitting image data to the wrong destination. However, while a single MFP is used as an image transmission apparatus by numerous users, if the administration of the apparatus is entrusted to a specific administrator, it is likely that administrator will be in charge of administration of destination information. For this reason, a problem arises that when a destination that one of the majority of users of the MFP needs to use is not already registered in the MFP, the user, unable to add the destination to those already registered himself/herself, will end up having to input the destination manually.

SUMMARY OF THE INVENTION

The present invention was conceived in view of the described problems, and has an object of providing an image transmission apparatus that, when used by a plurality of users, is highly convenient in terms of reducing the effort to designate a destination when a user transmits an image, and in particular when transmission of an image fails.

In order to achieve the described object, an image transmission apparatus of one aspect of the present invention is an image transmission apparatus that transmits image data to an image processing apparatus that processes the image data in accordance with a destination name of the image data, including: a transmitter operable to transmit image data in accordance with an instruction from a user; a destination name receiver operable to receive a destination name that is a name of a destination of the image data; a judgment part operable to judge whether or not the transmission of the image data succeeds or fails; a shared list that is shared by a plurality of users and that corresponds destination names with image processing apparatuses; and a plurality of individual lists, each of which is administered by a different one of the plurality of users and that corresponds the destination names with apparatuses other than the image processing apparatuses corresponded therewith in the shared list, wherein, when the judgment part judges that transmission of the image data to the image processing apparatus corresponded with the destination name in the shared list has failed, the transmitter transmits the image data to an apparatus that is corresponded with the destination name in the individual list administered by the user who instructed the transmission.

With the stated structure, the effort for the user to designate a destination when transmitting an image is reduced, thus achieving a high level of convenience. In particular, an individual list that is referred to when the image data cannot be transmitted to the image processing apparatus shown in the shared list is provided for each user of the image processing apparatus, and therefore the user can designate the destination flexibly in accordance with his/her needs.

Furthermore, the same effects can be achieved by an image transmission apparatus used by a plurality of users, including: a transmitter operable to transmit image data in accordance with an instruction from a user; a destination name receiver operable to receive a destination name that is a name of a destination of the image data; a judgment part operable to judge whether or not the transmission of the image data succeeds or fails; a shared list that is shared by the plurality of users and that corresponds destination names with image processing apparatuses; and a history list that corresponds transfer destinations with the destination names, each transfer destination being an apparatus to which transmitted image data has been transferred in the past, wherein when the destination name receiver receives the destination name, the transmitter transmits the image data to the image processing apparatus corresponded with the received destination name in the shared list, and when the judgment part judges that the transmission has failed, the transmitter transmits the image data to the apparatus corresponded with the received destination name in the history list.

Furthermore, an image transmission program according to one aspect of the present invention is an image transmission program embodied in a computer readable medium and being executed by an image transmission apparatus that transmits image data to an image processing apparatus that processes the image data in accordance with a destination name of the image data, the image transmission apparatus storing (a) a shared list that is shared by a plurality of users and that corresponds destination names with image processing apparatuses, and (b) a plurality of individual lists, each of which is administered by a different one of the plurality of users and that corresponds the destination names with apparatuses other than the image processing apparatuses corresponded therewith in the shared list, the image transmission program causing the image transmission apparatus to perform the steps of: receiving a destination name that is a name of a destination of image data; transmitting the image data in accordance with an instruction from a user; and judging whether or not the transmission of the image data succeeds or fails, wherein, when it is judged that transmission of the image data to the image processing apparatus corresponded with the destination name in the shared list has failed, the image data is transmitted to an apparatus that is corresponded with the destination name in the individual list administered by the user who instructed the transmission. This reduces the effort for the user to designate a destination when transmitting an image, thus achieving a high level of convenience. In particular, an individual list that is referred to when the image data cannot be transmitted to the image processing apparatus shown in the shared list is provided for each user of the image processing apparatus, and therefore the user can designate the destination flexibly in accordance with his/her needs.

Furthermore, an image transmission program of one aspect of the present invention is an image transmission program embodied in a computer readable medium and being executed by an image transmission apparatus that is used by a plurality of users, the image processing apparatus storing a shared list that is shared by the plurality of users and that corresponds destination names with image processing apparatuses, the image transmission program causing the image transmission apparatus to perform the steps of: receiving a destination name that is a name of a destination of image data; transmitting the image data in accordance with an instruction from a user; and judging whether or not the transmission of the image data succeeds or fails, wherein, the image transmission apparatus further stores a history list that corresponds transfer destinations with the destination names, each transfer destination being an apparatus to which transmitted image data has been transferred in the past, when the destination name is received in the destination name receiving step, in the transmitting step, the image data is transmitted to the image processing apparatus corresponded with the received destination name in the shared list, and when, in the judgment step it is judged that the transmission has failed, in the transmission step the image data is transmitted to the apparatus corresponded with the received destination name in the history list. This reduces the effort for the user to designate a destination for the image data.

BRIEF DESCRIPTION OF THE DRAWINGS

These and other objects, advantages and features of the invention will become apparent from the following description thereof taken in conjunction with the accompanying drawings which illustrate specific embodiments of the invention.

In the drawings:

FIG. 20 shows an example of a transmission report that the transmission-side MFP attaches to image data in a fifth embodiment of the present invention;

FIG. 23 shows an example of display of home MFPs and the like of each destination user in a modification example (14) of the present invention.

DESCRIPTION OF THE PREFERRED EMBODIMENTS

The following describes preferred embodiments of an image transmission apparatus of the present invention using an example of an image communication system, with reference to the drawings.

1. First Embodiment

The image communication system relating to the first embodiment of the present invention includes a plurality of MFPs. A feature of the image communication system is that each MFP includes a destination user list set individually for the MFP by an administrator, and a plurality of address books, each of which is set by a different individual user of the MFP, and when image data is to be transmitted, the destination is automatically set based on the user list and the address book of the user sending the image data.

(1) Structure of the Image Communication System

First, a description is given of the structure of the image communication system relating to the present embodiment.

Figure 1:
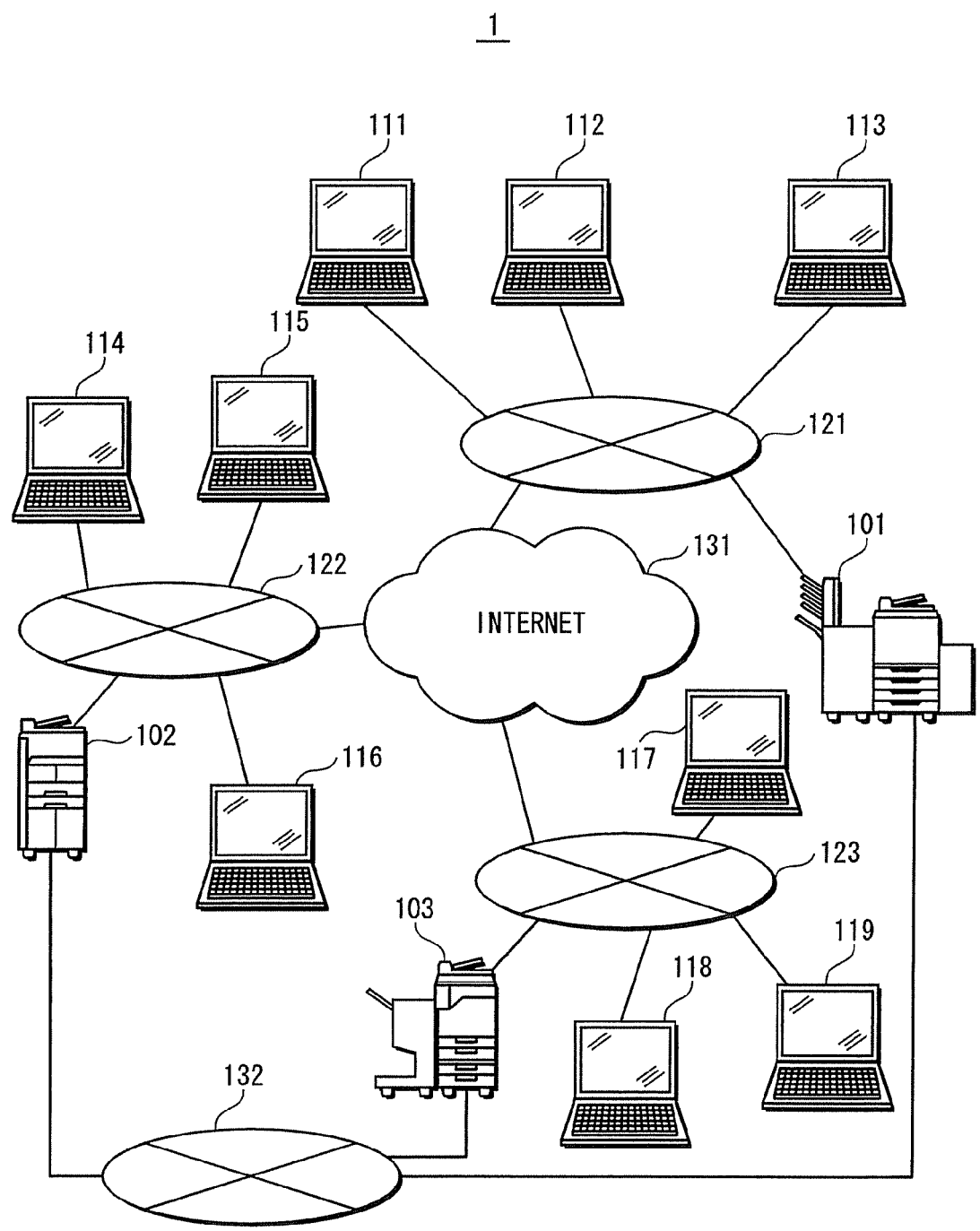
FIG. 1 shows the structure of the image communication system of a first embodiment of the present invention.

As shown in FIG. 1, an image communication system 1 is composed of MFPs 101 to 103, personal computers (hereinafter called "PC(s)") 111 to 119, local area networks (hereinafter called "LAN(s)") 121 to 123, the Internet 131, and a circuit switching network 132.

The MFP 101 and the PCs 111 to 113 are connected by a LAN 121, and the MFP 102 and the PCs 114 to 116 are connected by the LAN 122. Furthermore, the MFP 103 and the PCs 117 to 119 are connected by the LAN 123.

Accordingly, the MFP 101 and the PCs 111 to 113 are able to perform communication, such as sending and receiving e-mail and referring to web pages, with each other via the LAN 121. Similarly, the MFP 102 and the PCs 114 to 116 are able to communicate with each other via the LAN 122. Furthermore, the MFP 103 and the PCs 117 to 119 are able to perform communication, such as transmission and reception of e-mail and facsimiles, with each other via the LAN 123.

The LANs 121 to 123 are connected to the Internet 131, and the MFPs 101 to 103 are also connected to a circuit switching network 132. As such, the MFPs 101 to 103 are able to perform communication with each other via both the Internet 131 and the circuit switching network 132.

The users of the PCs 111 to 113 use the MFP 101 mainly, the users of the PCs 114 to 116 use the MFP 102 mainly, and the users of the PCs 117 to 119 use the MFP 103 mainly. Hereinafter, the MFP used mainly by each user is referred to as a home MFP. For instance, the home MFP of the users of the PCs 111 to 113 is the MFP 101.

(2) Structure of MFPs 101 to 103

Next, a description is given of the main structure of the MFPs 101 to 103. Since the characteristic structure of the MFPs 101 to 103 is identical, the description of the MFP 101 also applies to the MFP 102 and 103.

Figure 2:
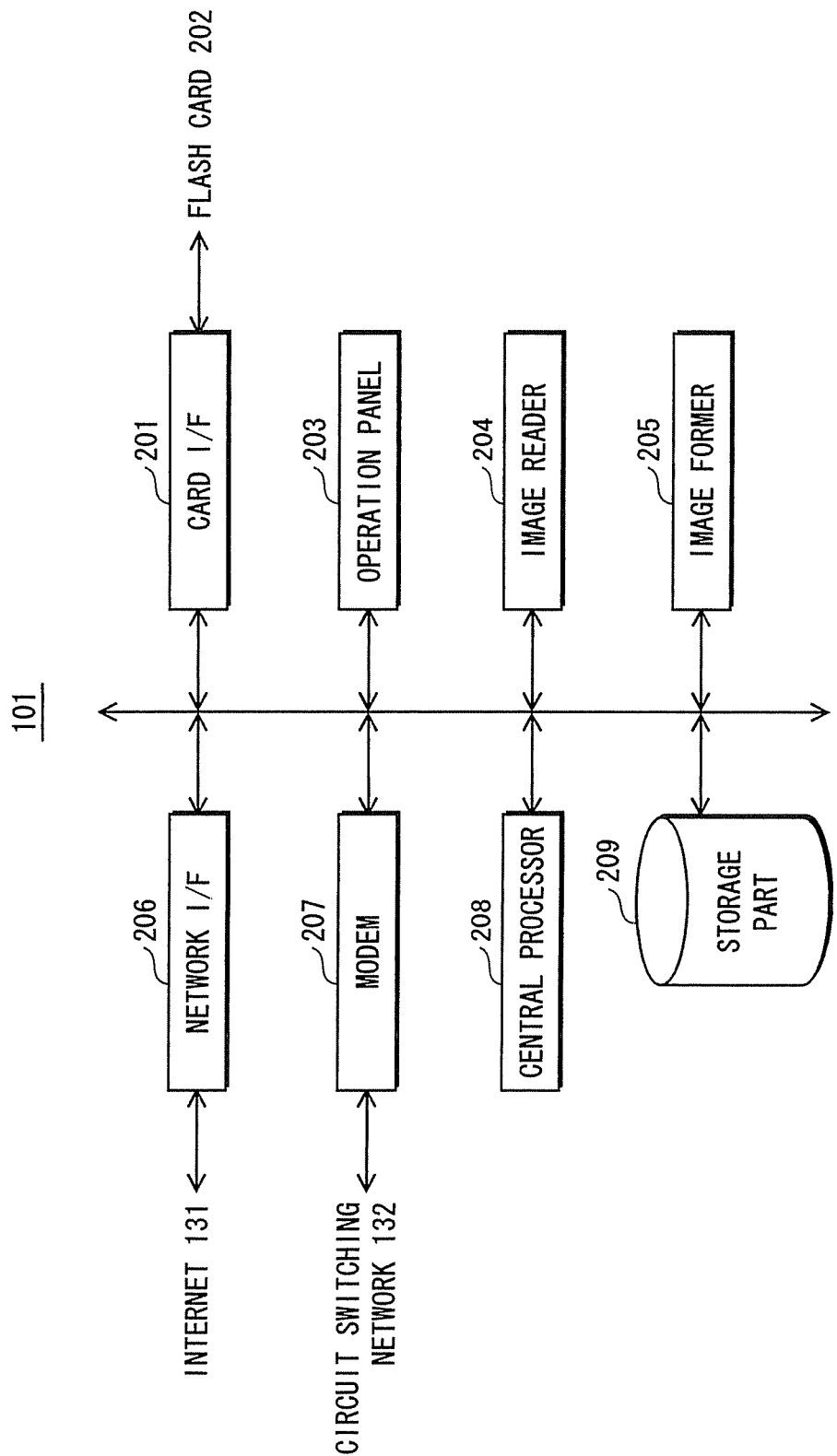
FIG. 2 shows the principal hardware structure of an MFP 101 of the first embodiment of the present invention.

As shown in FIG. 2, the MFP 101 is composed of a card I/F 201, an operation panel 203, an image reader 204, an image former 205, a network I/F 206, a modem 207, a central processor 208, and a storage part 209.

The card I/F 201 accesses a flash card 202 and reads authentication information therefrom to authenticate a user who is attempting to use the MFP 101. Furthermore, the card I/F 201 writes information such as billing information to the flash card 202.

The operation panel 203 includes input keys and an LCD (liquid crystal display) apparatus, and has functions such as receiving input from the user of the MFP 101 via the input keys, and presenting information to the user on the LCD apparatus. The LCD apparatus includes a touch panel, and receives input from the user via this touch panel.

The image reader 204 is a scanner, and includes an ADF (automatic document feeder). Upon being instructed by the user via the operation panel 203 to read a document, the image reader 204 reads the document placed on a document glass, or conveys the document in the ADF one page at a time and reads the pages by means of a 3 line color line sensor.

Note that included in the document read instruction that the image reader 204 receives from the user is a designation of a reading mode. As one example, the reading mode may be an instruction instructing whether one side of the pages of document or both sides of the pages of the document are to be read.

The image former 205 reads image data stored in the storage part 209 and prints an image on paper, based on instruction from the central processor 208. Here, a designation of a printing mode to be used is included in the instruction from the central processor 208. Examples of the specification of the printing mode include a designation of one-sided printing or double-sided printing, a designation of color printing or monochrome printing, and a designation of a scale of enlargement or reduction.

The network I/F 206 is a communication interface apparatus for communicating with other MFPs and the PCs 111 to 119 via the LAN 121 or the Internet 131. As one example, when the LAN 121 is an Ethernet (PR), an Ethernet (R) I/F card is used as the network I/F 206.

The modem 207 is a communication interface apparatus for transmitting and receiving facsimiles with other MFPs via the circuit switching network 132. As one example, the modem 207 may comply with the G4 standard, and in this case an ISDN (integrated services digital network) is used as the circuit switching network 132.

The central processor 208 is a CPU (central processing unit), and has a function of reading and executing a program stored in the storage part 209. Programs executed by the central processor 208 include a communication program for transmitting and receiving image data with other MFPs or the PCs 111 to 119.

The storage part 209 includes both an internal storage apparatus such as a semiconductor memory, and an external storage apparatus such as a HDD (hard disk drive). In addition to programs executed by the central processor 208, the storage part 209 stores data including image data read by the image reader 204 and image data transmitted to or received from other MFPs or the PCs 111 to 119.

(3) Communication Operations by the MFPs 101 to 103

Next a description is given of communication operations by the MFPs 101 to 103. Here, the data structure of destination information used in communication is first described, and then the processing content is described.

(a) Data Structure

Each one of the MFPs 101 to 103 is shared by users for whom the one of the MFPs is a home MFP. The storage part 209 of the MFP stores a destination user list that the administrator of the MFP administers, individual address books administered by respective users, and receiver settings corresponding to each user.

(i) Destination user List

The destination user list is a table that associates names of users who are destinations, and names of the home MFP of the users who are destinations. As described later, the destination user list is referred to in order to specify the home MFP of another user when transmitting image data to that user.

Figure 3:
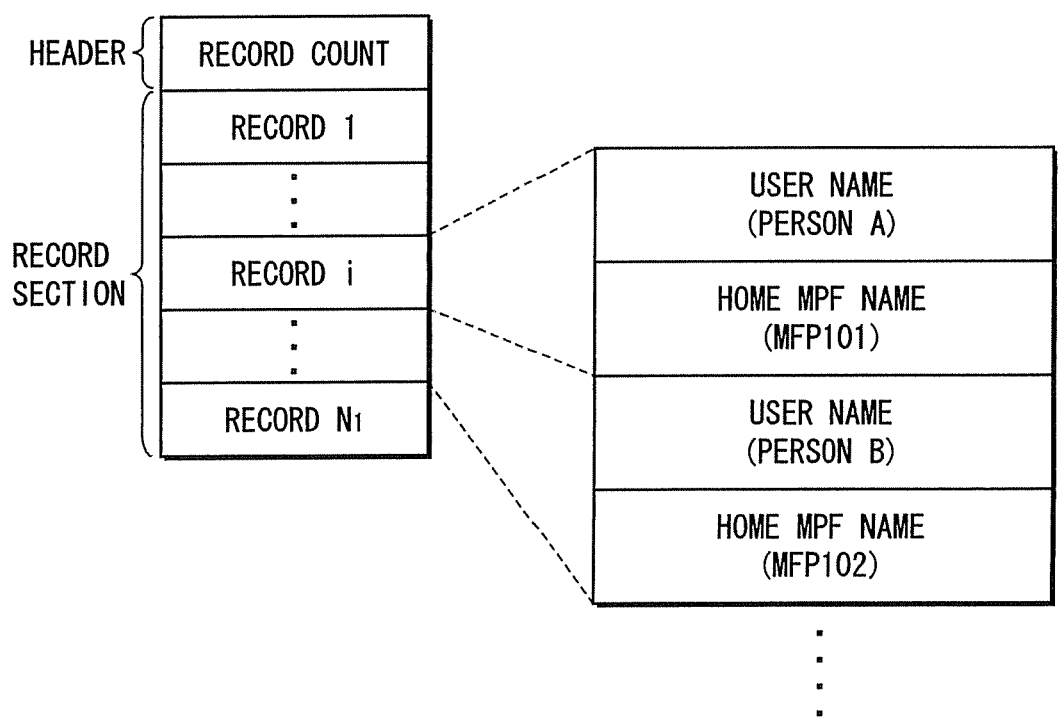
FIG. 3 shows the data structure of a destination user list of the first embodiment of the present invention.

The destination user list is stored in the home MFP 103, for instance. As shown in FIG. 3, a destination user list 3 is composed of a header that is located at the head of a file and that stores a record count, and a record section that follows the header and is made up of records equal in number to the record count. Each record stores a user name and a home MFP name corresponding to the user name. In the illustrated example, a home MFP name 101 is stored in correspondence with a user name person A, and a home MFP name 102 is stored in correspondence with a user name person B.

(ii) Individual Address Book

The individual address book is a table that associates names of users who are destinations and e-mail addresses, facsimile numbers and the like of the users. As described later, the individual address book is referred to in cases such as when communication with a home MFP shown in the destination user list is not possible, or when the image data is to be transmitted to a user not registered in the destination user list.

Figure 4:
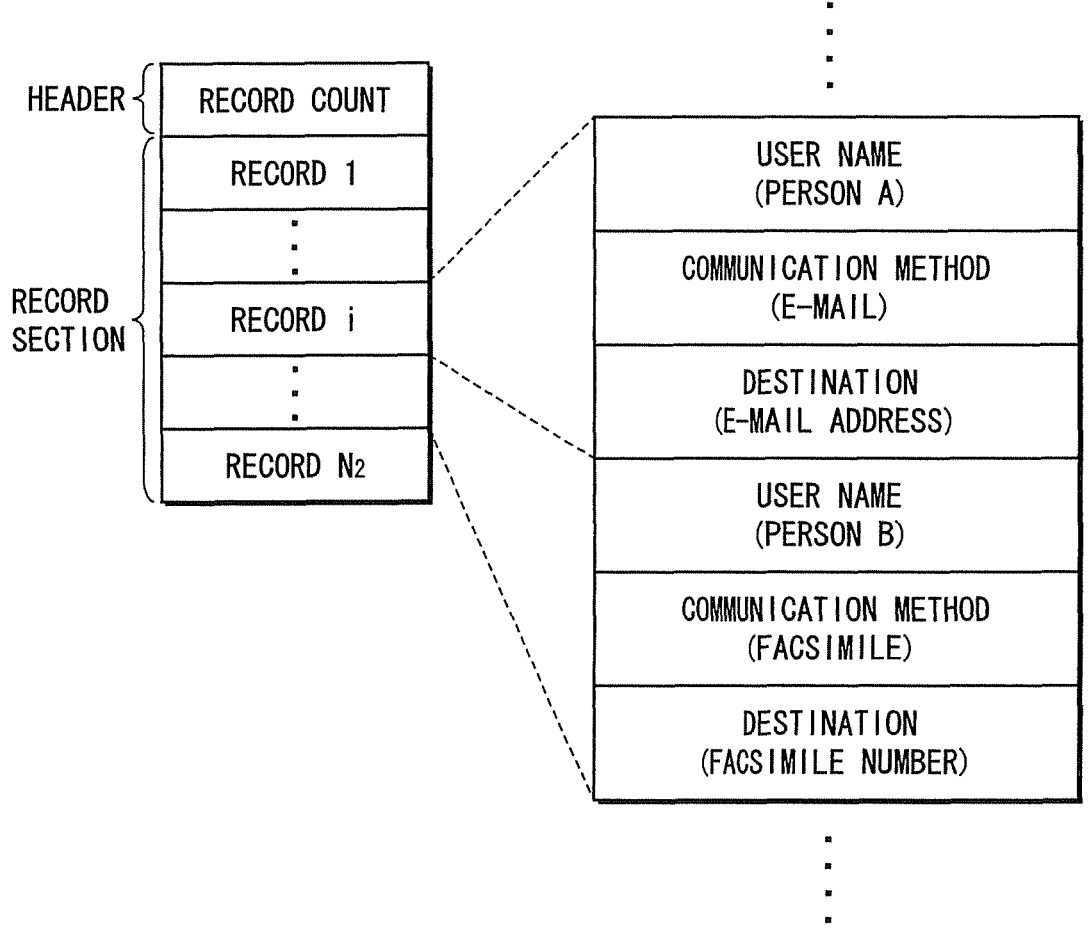
FIG. 4 shows the data structure of an individual address book of the first embodiment of the present invention.

The individual address book is stored in the home MFP 103, for instance. As shown in FIG. 4, an individual address book 4 is composed of a header that stores a record count, and a record section that follows to the header and is made up of records equal in number to the record count. Each record stores a user name, a communication method to be used for the corresponding user, and a destination corresponding to the communication method of the corresponding user.

The communication method in each record may be e-mail, facsimile, or a kind of transfer method (e.g., SMB (server message block) The destination is an e-mail address, a facsimile number, and IP address, a folder name, or the like, depending on the designated communication method. In the illustrated example, the communication method is stored in correspondence with person A is e-mail, and an e-mail address is stored in correspondence as the destination. Furthermore, the communication method is stored in correspondence with person B is facsimile, and a facsimile number is stored in correspondence as the destination.

(iii) Receiver Settings

The receiver settings is a table that designates how an MFP processes image data when the MFP receives the image data destined to a user whose home MFP is the MFP itself.

Figure 5:
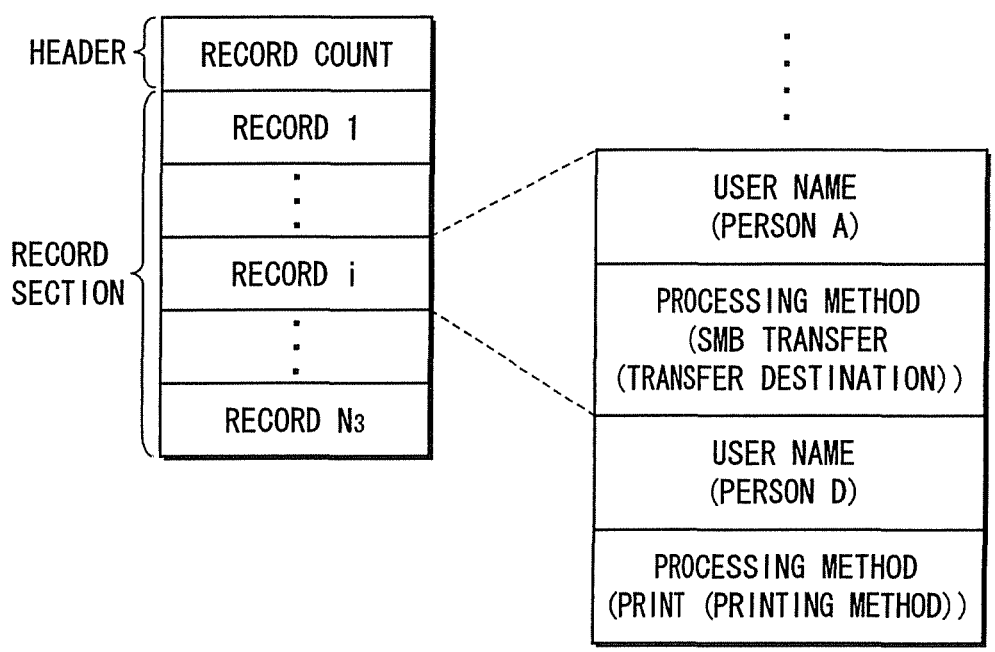
FIG. 5 shows the data structure of receiver settings of the first embodiment of the present invention.

The receiver settings are stored in the MFP 101, for instance. As shown in FIG. 5, receiver settings 5 are composed of a header that stores a record count, and a record section that is made up of that is made up of records equal in number to the record count. Each record stores a user name and a processing method for when image data is received address to that user. In the illustrated example, a processing method SMB transfer (including an IP address and a folder name) is stored in correspondence with the user name person A, and a processing method print (including a printing method) is stored in correspondence with a user name person D.

(b) Communication Sequence

Next a description is given of the communication sequence in the image communication system 1. The following description uses an example of the transmission-side MFP being the MFP 103, the reception-side MFP being the MFP 101, and "person A" being designated as the transmission destination (receiver name). Note that a description is omitted of processing such as that relating to what kind of protocol is used for retransmission at lower layers.

(i) Normal Operation

Normal operations are first described.

Figure 6:
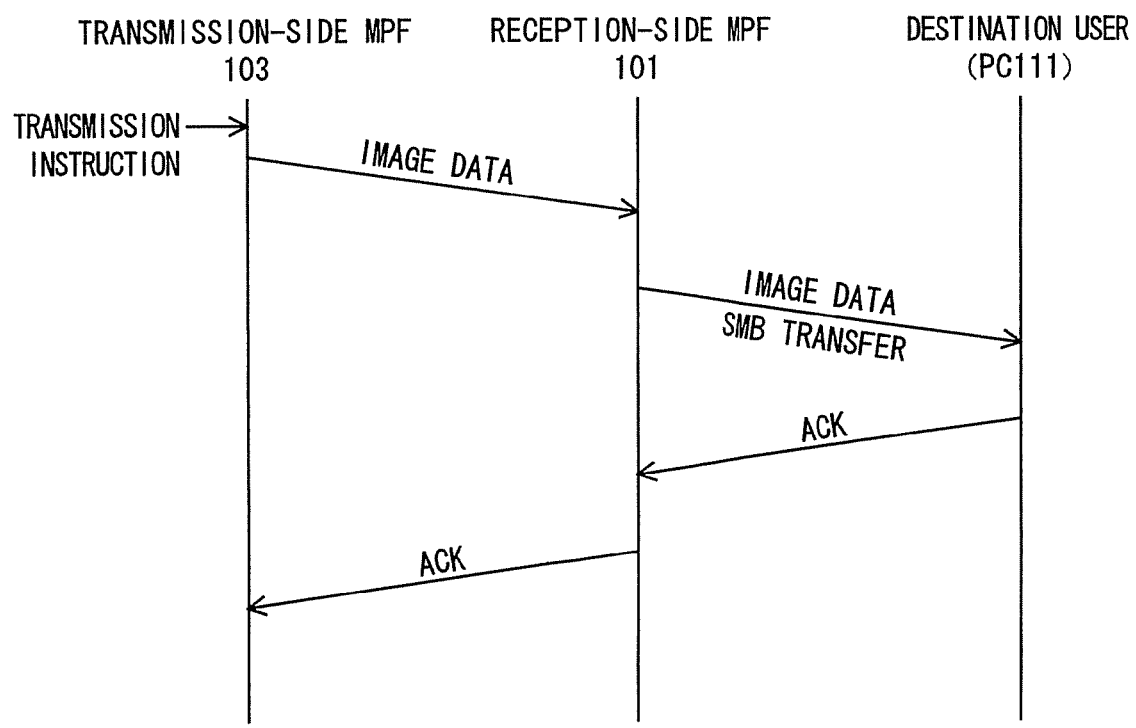
FIG. 6 is a communication sequence diagram showing normal operations of an image communication system 1 of the first embodiment of the present invention.

As shown in FIG. 6, upon receiving a transmission instruction from the user to transmit image data to person A, the transmission-side MFP 103 refers to the destination user list 3 to specify the MFP 101 as the home MFP (reception-side MFP) of the destination user (person A), and transmits the image data.

Upon receiving the image data, the reception-side MFP 101 refers to the receiver settings 5 to specify processing method for the destination user of the image data. Since the destination user is person A here, SMB transfer is specified as the processing method. Since the processing method is SMB transfer, the reception-side MFP 101 transfers the image data to the designated destination (e.g., the PC 111 that is used by person A).

Application software for receiving SMB transfer is pre-installed and executed in the PC 111, and if the image data is transferred normally to a predetermined folder in the PC, this software transmits a response (acknowledgment) to this effect (an ACK) to the reception-side MFP 101. If an ACK showing normal reception is received from the PC 111, the reception-side MFP 101 transmits an ACK showing normal reception to the transmission-side MFP 103. If the transmission-side MFP 103 receives an ACK showing normal reception from the reception-side MFP 101, the communication sequence is complete. Note that instead of SMB transfer, the image data may be transmitted attached to an e-mail. In such a case, a predetermined mail server that receives the e-mail transmits an ACK showing normal reception.

(ii) When Communication is Not Possible (Case 1)

Next a description is given of a case in which communication between the transmission-side MFP and the reception-side MFP is not possible.

Figure 7:
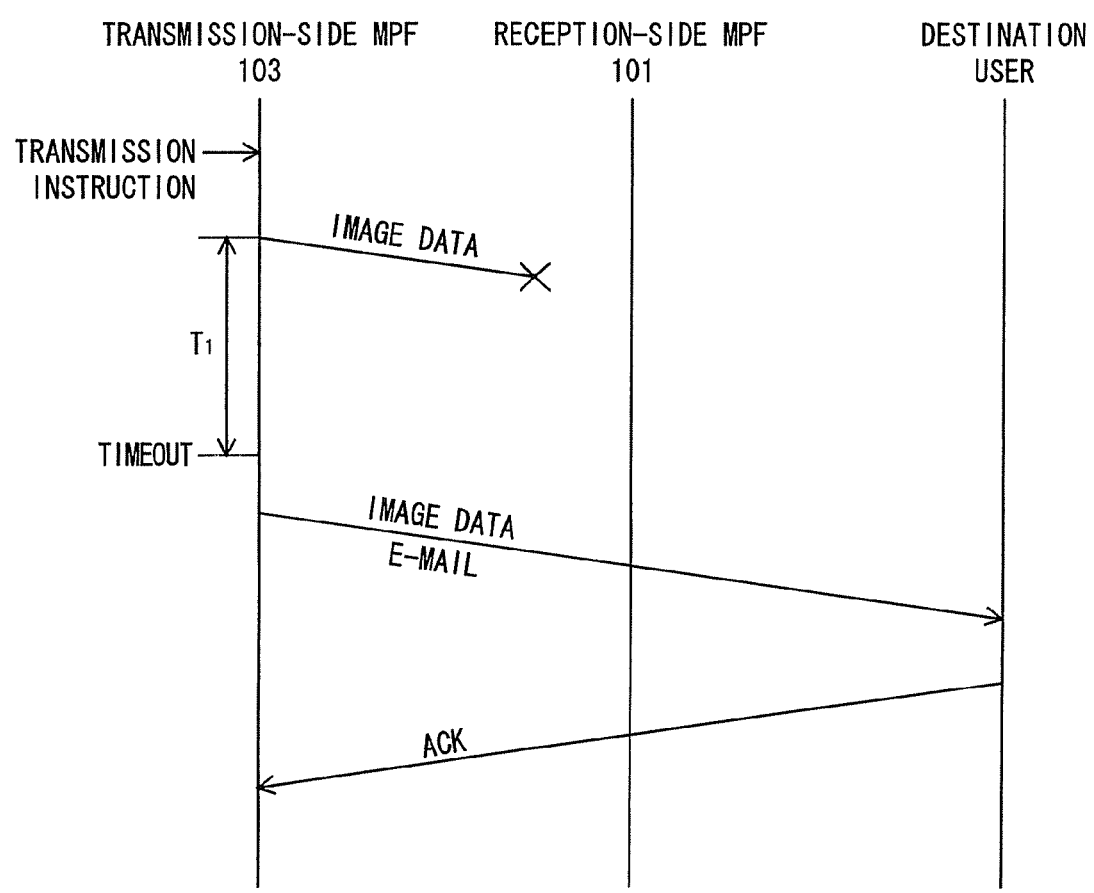
FIG. 7 is a communication sequence diagram showing a case in which communication is not possible between a transmission-side MFP and reception-side MFP in the image communication system 1 of the first embodiment of the present invention.

As shown in FIG. 7, when communication between the transmission-side MFP 103 and the reception-side MFP 101 is not possible, even if the transmission-side MFP 103 receives a transmission instruction from the user to transmit the image data to person A and transmits the image data to the reception-side MFP 101, the image data is not received by the reception-side MFP 101.

If a time T1 elapses without receiving an ACK from the reception-side MFP 101 after transmitting the image data, the transmission-side MFP 103 judges that communication between the transmission-side MFP 103 and the reception-side MFP 101 is not possible.

Having made this judgment, the transmission-side MFP 101 refers to the individual address book of the of the user who instructed image data transmission (a user authenticated based on information in the flash card 202) to specify the communication method (e-mail) and the destination (mail address) corresponding to the destination user (person A), and transmits the image data to the specified destination (mail address) using the specified communication method.

The PC 111 receives the image data attached to an e-mail via the predetermined mail server. An ACK is transmitted to the transmission-side MFP 103. When the transmission method is e-mail, the ACK may be sent from the mail server that received the e-mail. Examples of the ACK are DSN (delivery status notification) and MDN (message disposition notification). Note that when the PC on the destination user—side receives the e-mail in a sufficiently short interval, the PC may transmit the ACK. When the ACK is received by the transmission—side MFP 103, the communication sequence ends.

(iii) When Communication is Not Possible (Case 2)

Next, a description is given of when communication is not possible between the reception-side MFP and the destination of the image data (e.g., the PC).

Figure 8:
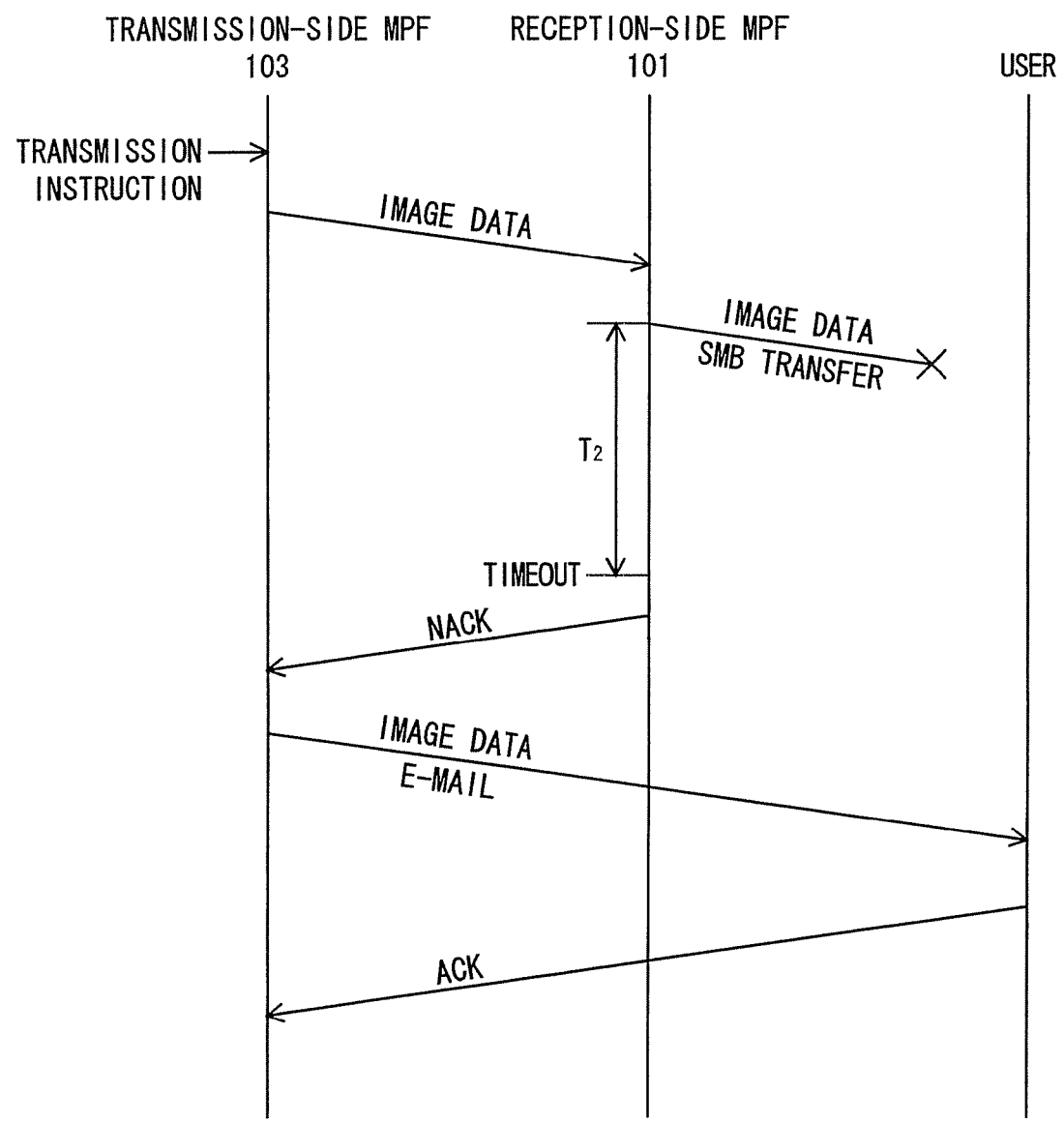
FIG. 8 is a communication sequence diagram showing a case in which communication is not possible between a reception-side MFP and an image data destination (PC) in the image communication system 1 of the first embodiment of the present invention.

As shown in FIG. 8, upon receiving a transmission instruction from the user to transmit image data, the transmission-side MFP 103 transmits the image data to the reception-side MFP 101.

If a time T2 elapses without receiving an ACK from the PC 111 after transmitting the image data, the reception-side MFP 101 judges that communication between the reception-side MFP 101 and the PC 111 is not possible, and transmits a response to that effect (NACK) to the transmission-side MFP 103.

Upon receiving the NACK from the reception-side MFP 101, the transmission-side MFP 103 refers to the individual address book of the user who instructed transmission of the image data to specify the communication method (e-mail) and the destination (mail address) corresponding to the destination user (person A), and transmits the image data to the specified destination (mail address) using the specified communication method (e-mail).

The PC 111 receives the image data attached to the e-mail via the mail server. An ACK is transmitted to the transmission-side MFP 103. As with the case of (ii) described earlier, the ACK is transmitted from either the mail server or the PC 111. When the transmission-side MFP 103 receives the ACK, the communication sequence ends.

(c) Operations by the MFPs 101 to 103

Next a description is given of operations by the MFPs 101 to 103 for executing the described transmission and reception of image data.

(i) Operations by the Transmission-Side MFP

First a description is given of operations by the transmission-side MFP.

Figure 9:
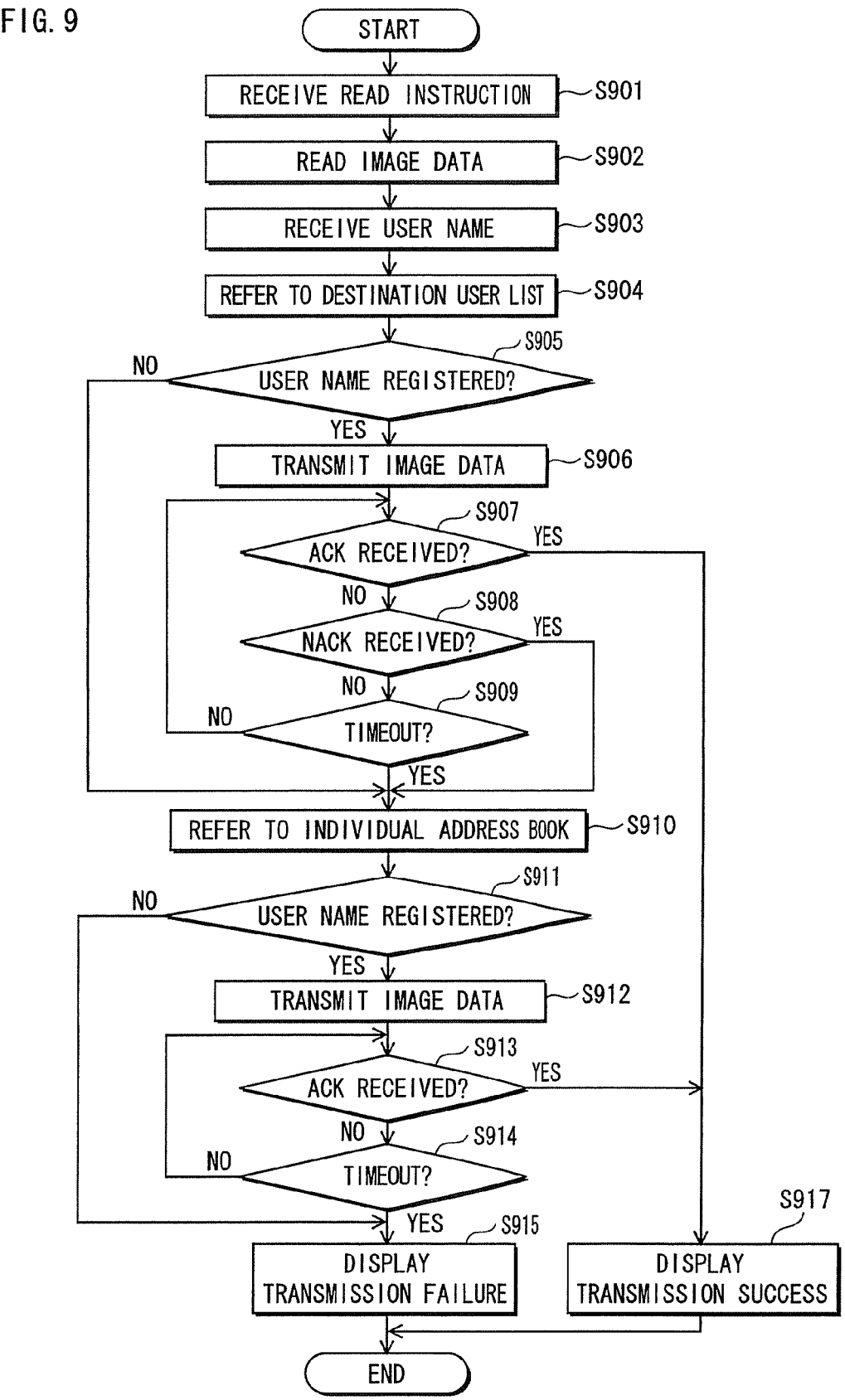
FIG. 9 is a flowchart showing operations by a transmission-side MFP in the first embodiment of the present invention.

As shown in FIG. 9, upon receiving a read instruction to read image data by way of the operation panel 203 (S901), the transmission-side MFP reads the image data by way of the image reader 204 (S902).

Next, upon receiving a user name that is a transmission destination of the image data by way of the operation panel 203 (S903), the transmission-side MFP refers to the destination user list, and checks whether the received user name is registered in the destination user list (S904).

If the user name is registered in the destination user list (S905: YES), the transmission-side MFP transmits the image data to the reception-side MFP corresponding to the user name (S906). If an ACK is subsequently received from the reception-side MFP (S907: YES), the transmission-side MFP displays notification of transmission success on the operation panel 203 (S916), and ends the processing.

If an ACK is not received (S907: NO), if a NACK is received (S908: YES), in the occurrence of a timeout (S909: YES), or if the user name is not registered in the destination user list (S905: NO), the transmission-side MFP refers to the individual address book to check whether or not the user name is registered (S910).

If the user name is registered in the individual address book (S911: YES), the transmission-side MFP uses the transmission method corresponding to the user to transmit the image data to the destination corresponding to the user name (PC in FIG. 6). If an ACK is subsequently received from the PC (S913: YES), the transmission-side MFP displays notification of transmission success on the operation panel 203 (S916), and ends the processing.

If an ACK is not received (step S913: NO) before a timeout occurs (S914: YES), or if the user name is not registered in the individual address book (S911: NO), the transmission-side MFP displays notification of transmission failure on the operation panel 203 (S915), and ends the processing.

(ii) Operations by the Reception-Side MFP

Next a description is given of operations by the reception-side MFP.

Figure 10:
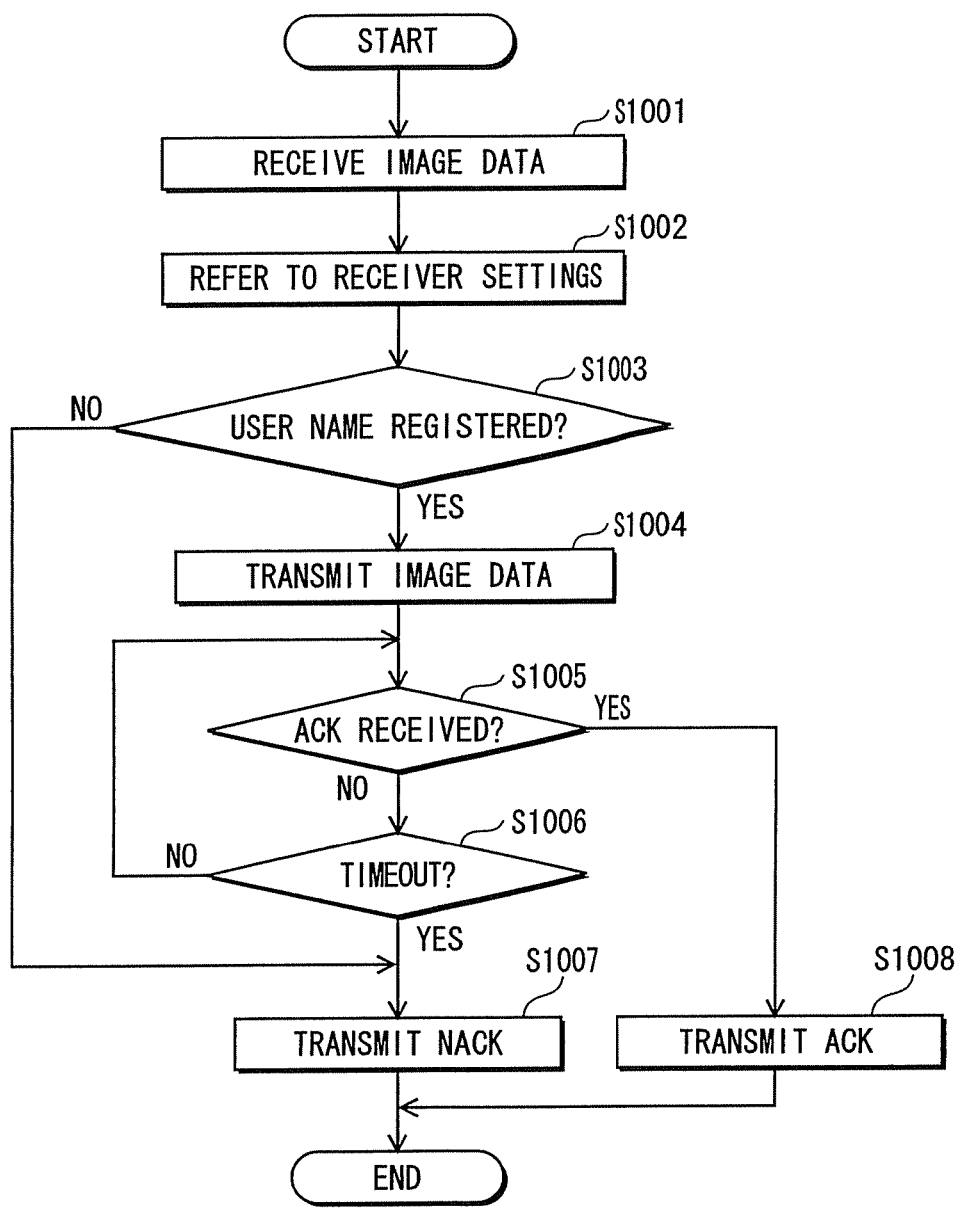
FIG. 10 is a flowchart showing operations by a reception-side MFP in the first embodiment of the present invention.

As shown in FIG. 10, upon receiving image data from the transmission-side MFP (S1001), the reception-side MFP checks whether or not the user name that is the destination of the image data is registered in the receiver settings (S1002).

If the user name is registered in the receiver settings (S1003: YES), the reception-side MFP processes the image data in accordance with the processing method registered in the receiver settings. The present description is of an example of the processing method being transfer to a PC. In other words, the reception side-MFP transmits the image data to a PC designated in the processing method (S1004).

If an ACK is subsequently received from the PC (S1005: YES), the reception-side MFP transmits an ACK to the transmission-side MFP (S1008). On the other hand, if an ACK is not received (S1005: YES) before a timeout occurs (S1006: YES), the reception-side MFP transmits a NACK to the transmission-side MFP (S1007).

The reception-side MFP also transmits a NACK to the transmission-side MFP in the case of the user name not being registered in the receiver settings (S1003: NO).

(d) Summary

As has been described, according to the image communication system of the present embodiment, in an MFP that is used by a plurality of users, a high level of convenience in terms of reducing the effort to designate a destination when a user transmits an image is achieved.

2. Second Embodiment

Next a description is given of an image communication system relating to a second embodiment of the present invention. While the image communication system of the second embodiment has basically the same structure as the image communication system of the first embodiment, it differs in that the transmission-side MFP records transmission history of image data.

The following description focuses principally on the aspects that differ from the first embodiment.

(1) Communication Sequence

First a description is given of the communication sequence in the image communication system of the present embodiment. Note that in the same way as the first embodiment, the following description is of an example of the transmission-side MFP being the MFP 103, the reception-side MFP being the MFP 101, and the destination user being person A (PC 111).

Figure 11:
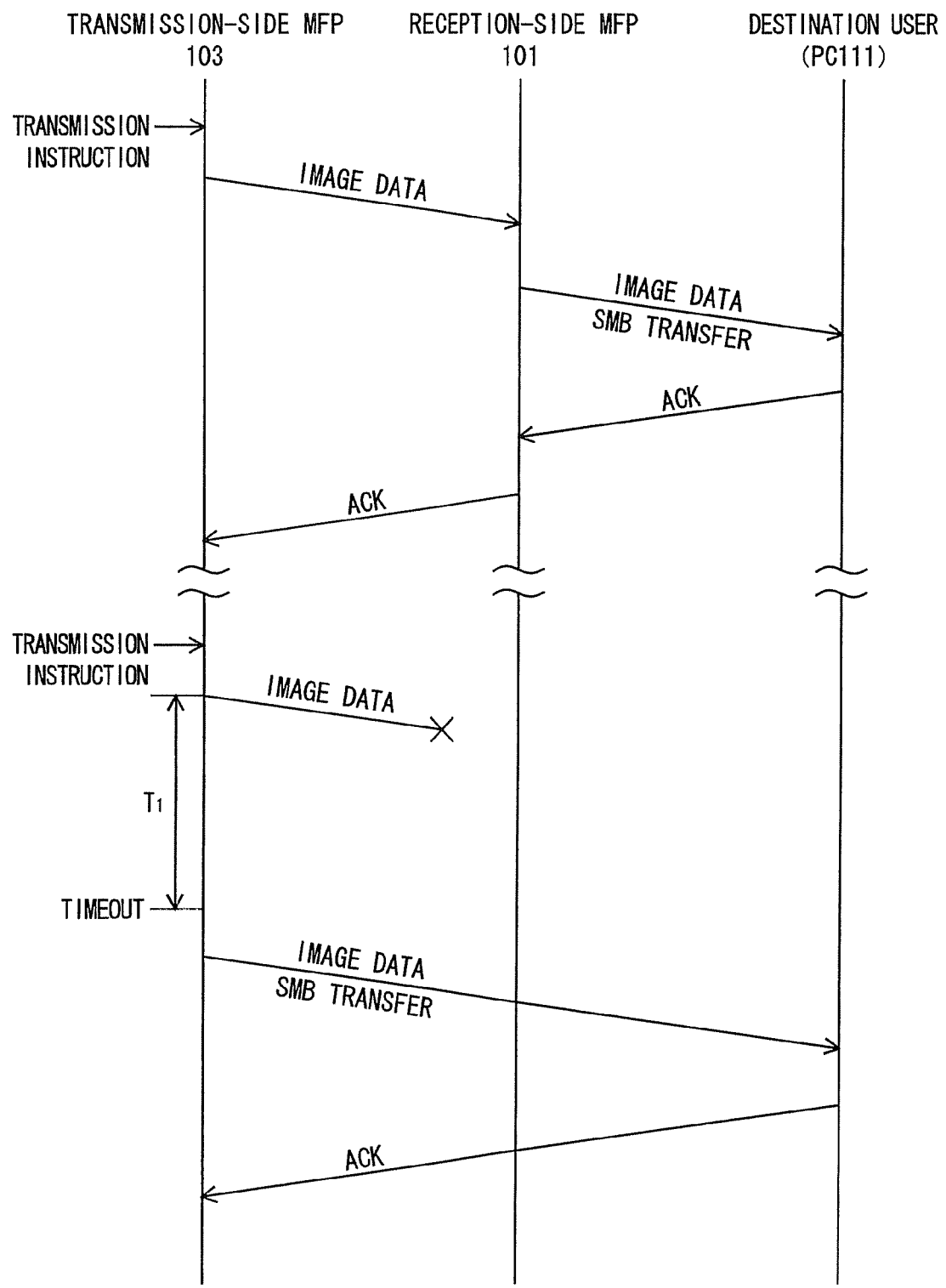
FIG. 11 is a communication sequence diagram showing operations in an image communication system of a second embodiment of the present invention.

As shown in FIG. 11, upon receiving a transmission instruction to transmit image data to person A, the MFP 103 transmits the image data to the reception-side MFP 101. Having received the image data from the transmission-side MFP 103, the reception-side MFP 101 transfers the image data to the PC 111 used by person A.

Having received the image data from the reception-side MEP 101, the PC 111 transmits an ACK to the reception-side MFP 101. The reception-side MFP 101 receives the ACK from the PC 111, and transmits, to the MFP 103, an ACK that includes the communication method (SMB transfer) and destination (IP address, folder name) corresponding to transmission of the image data to the PC 111. The transmission-side MFP 103 receives the ACK from the reception-side MFP 101, and registers, as history information, the communication method and destination included in the ACK in correspondence with the destination user name (person A) relating to the transmission instruction.

Subsequently, if an ACK is not received from the reception-side MFP 101 during a time T1 from when the image data is transmitted after receiving the image data transmission instruction, the transmission-side MFP 103 judges that transmission of the image data to the reception-side MFP 101 has failed. If a transmission method and destination corresponding to the destination user name (person A) relating to the image data transmission instruction are registered in the history information, the transmission-side MFP 103 transmits the image data to the registered destination using the registered communication method (SMB transfer).

When the transmission-side MFP 103 subsequently receives an ACK from the PC 111, the communication sequence is complete.

Figure 12:
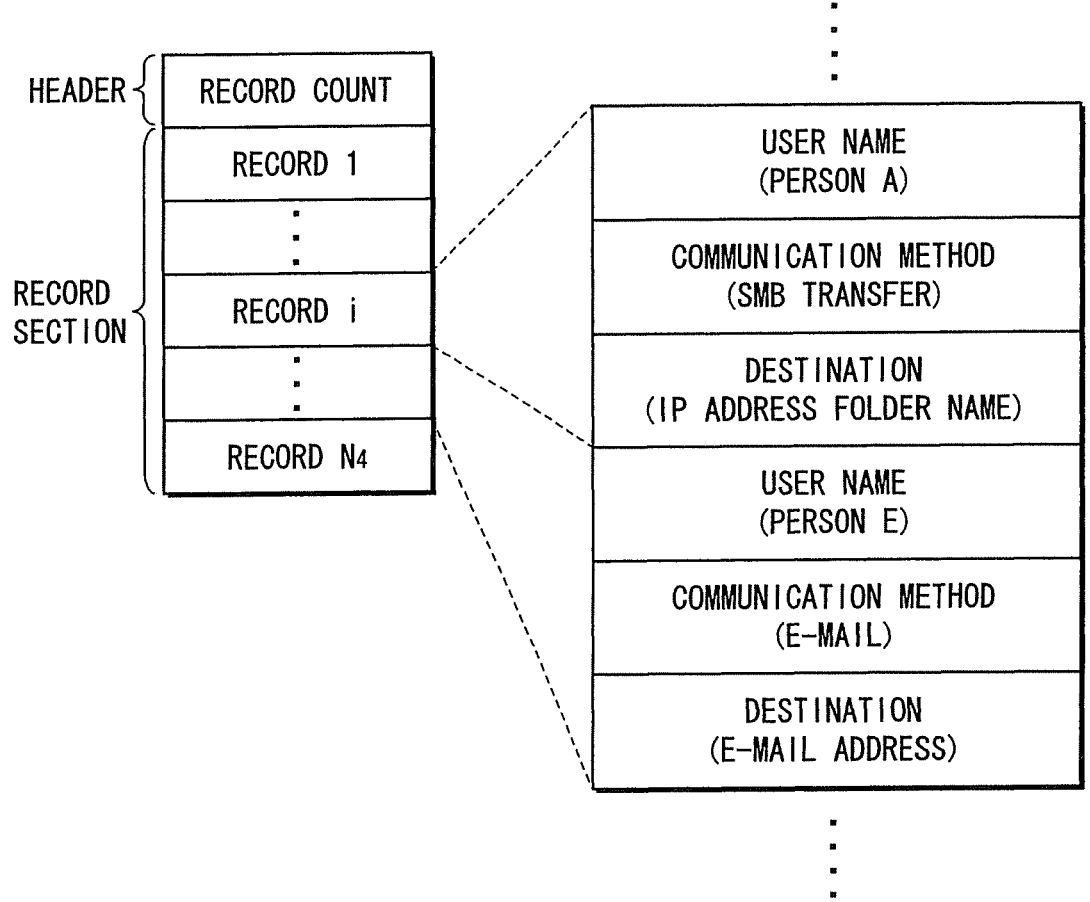
FIG. 12 shows the data structure of history information in the second embodiment of the present invention.

As shown in FIG. 12, history information 12 includes a header that stores a record count, and following the header, a record section that is made up of records equal in number to the record count. Stored in each record is the destination user name relating to the transmission instruction, the communication method that was included in the ACK from the reception-side MFP (e.g, SMB transfer, e-mail, or facsimile) and the destination (e.g., IP address and folder name, mail address, or facsimile number).

(2) MFP Operations

Next a description is given of operations by the MFPs. Here, a description is given of operations by the transmission-side MFP. With the exception of incorporating the communication method and destination in the ACK transmitted to the transmission-side MFP, the operations by the reception-side MFP are the same as those of the reception-side MFP in the first embodiment, and therefore a description is omitted.

Figure 13:
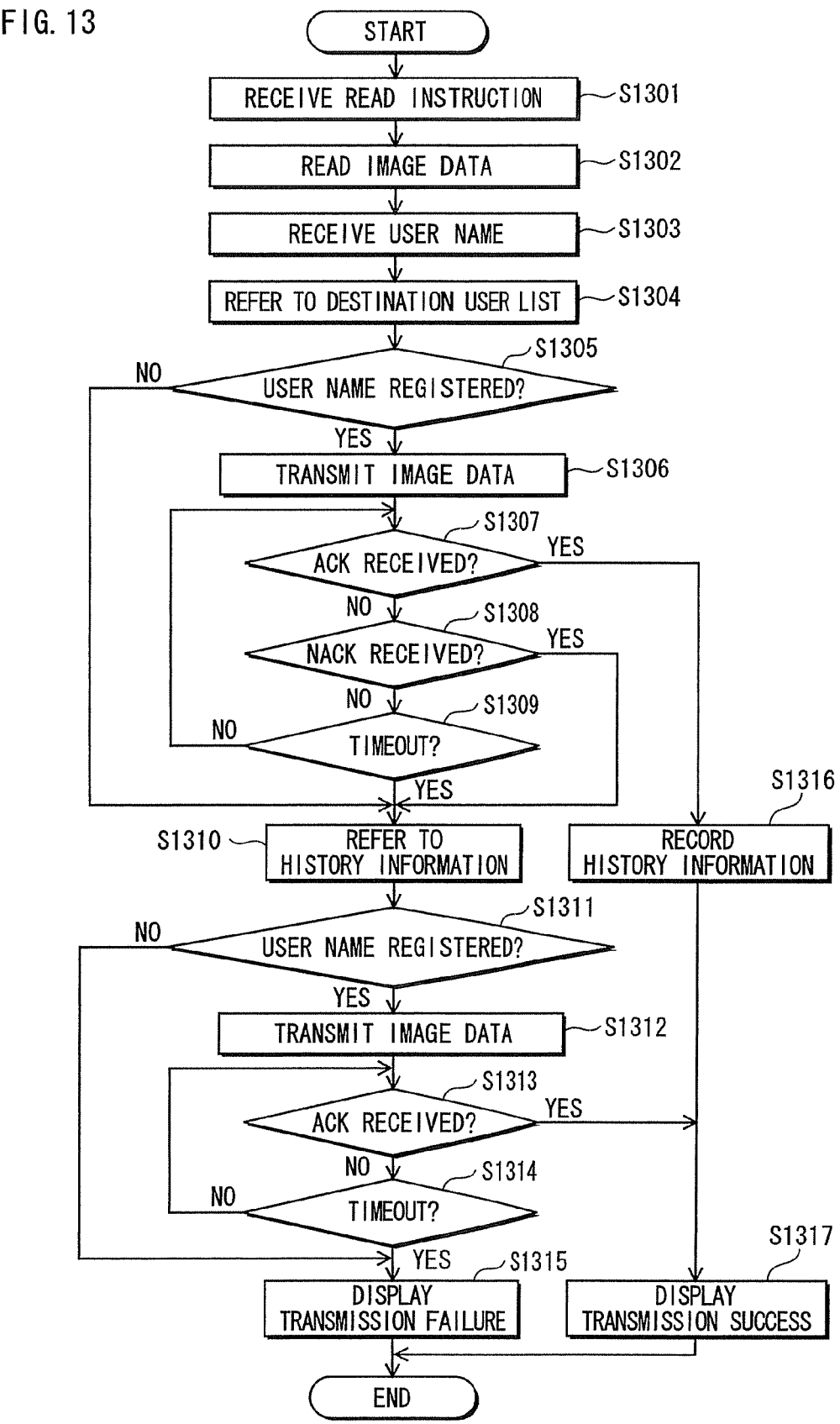
FIG. 13 is a flowchart showing operations by a transmission-side MFP in the second embodiment of the present invention.

As shown in FIG. 13, upon receiving a read instruction from the user to read image data (step S1301), the transmission-side MFP reads the image data (S1302).

Next, upon receiving from the user the user name that is the transmission destination (S1303), the transmission-side MFP refers to the destination user list to check whether the user name is registered (S1304).

If the user name is registered in the destination user list (S1305: YES), the transmission-side MFP transmits the image data to the reception-side MFP corresponding to the user name (S1306). If an ACK is subsequently received from the reception-side MFP (S1307: YES), the transmission-side MFP registers the destination user name relating to the transmission instruction in correspondence with the communication method and destination in the ACK as history information (S1316), displays notification of transmission success (S1317), and ends the processing.

When an ACK is not received (S1307: NO), a NACK is received (S1308: YES), or a timeout occurs (S1309: YES), the transmission-side MFP refers to the history information to check whether the user name is registered (S1310).

If the user name is registered in the history information (S1311:YES), the transmission-side MFP transmits the image data to the destination (e.g., PC) corresponding to the user name, using the communication method corresponding to the user name (step S1312). If an ACK is subsequently received from the PC or the like (S1313: YES), the transmission-side apparatus displays notification showing transmission success (S1317), and ends the processing.

If an ACK is not received (S1313: NO) and a timeout occurs (S1314: YES), the transmission-side MFP displays notification of transmission failure (S1315), and end the processing.

(3) Summary

As has been described, according to the image communication system of the present embodiment, in an MFP that is shared by a plurality of users, even if image data cannot be sent to the home MFP of a destination user designated by a user, the image data can be re-transmitted by referring to the history information. This achieves a high level of convenience in terms of reducing the effort to designate a destination when a user transmits an image.

3. Third Embodiment

Next a description is given of an image communication system relating to the third embodiment. While the image transmission system of the present embodiment has basically the same structure as the image transmission system of the first embodiment, it differs in that it receives, as the destination of the image data, a designation of a group that includes a plurality of destinations. The following description focuses principally on the aspects that differ from the first embodiment.

The communication sequence in the image communication system of the present embodiment is the same as the communication sequence in the image communication system of the first embodiment, and therefore a description thereof is omitted. A description of the operations of the reception-side MFP is omitted for the same reason, and the following describes only the operations of the transmission-side MFP.

Figure 14:
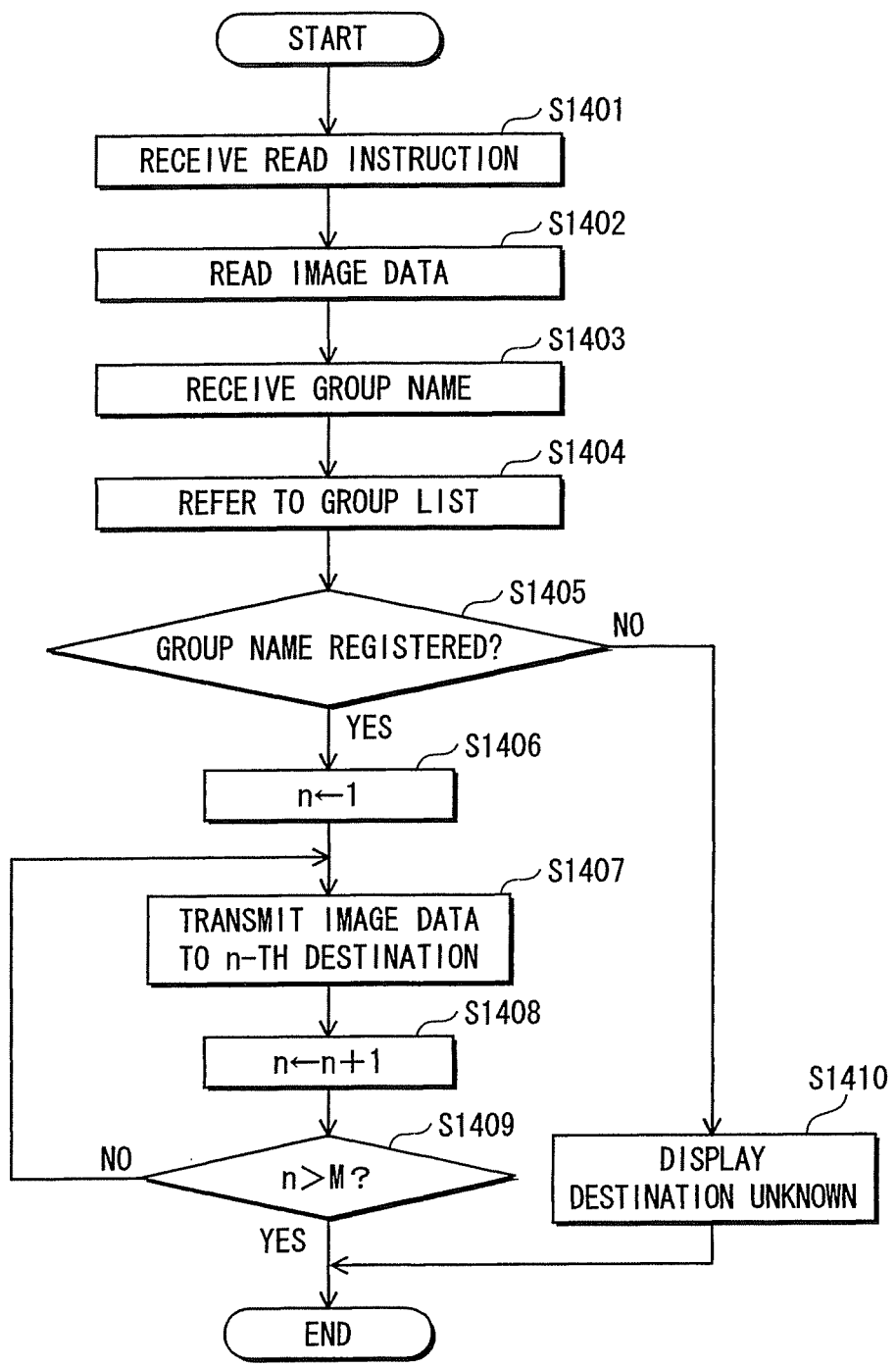
FIG. 14 is a flowchart showing operations by a transmission-side MFP in a third embodiment of the present invention.

As shown in FIG. 14, upon receiving a read instruction to read image data (S1401), the transmission-side MFP reads the image data (S1402).

Next, upon receiving a group name that is the transmission destination of the image data (S1403), the transmission-side MFP refers to the group list to check whether or not the group name is registered (S1404). If the group name is not registered in the group list (S1405: NO), this means that the destination users are unknown, and therefore the transmission-side MFP displays notification to the effect that the image data cannot be transmitted (S1410), and ends the processing.

When the group name is registered in the group list (S1405: YES), the transmission-side MFP transmits the image data to all destinations shown by the group name in the group list.

Figure 15:
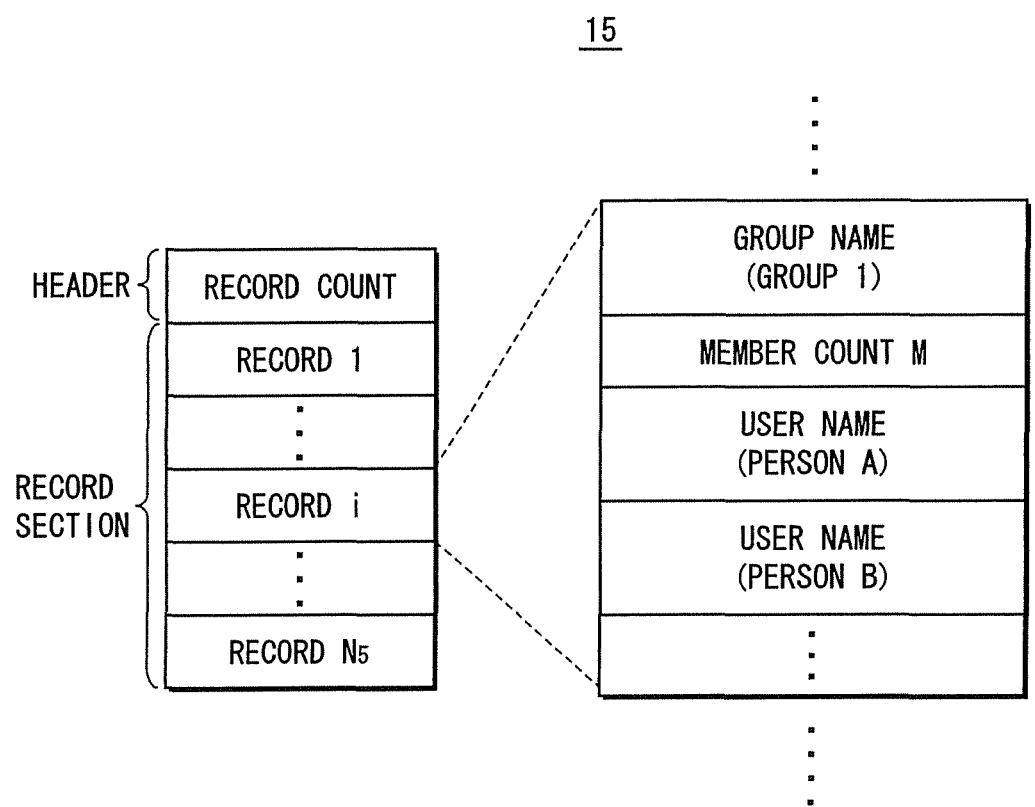
FIG. 15 shows the data structure of a group list in the third embodiment of the present invention.

As shown in FIG. 15, the group list 15 includes a header that stores a record count, and following the header, a record section that is made up of records equal in number to the record count.

Stored in each record is a group name, a member count M of the members in the group, and user names equal in number to the member count M. Here, the group name is a group name designated by a user as a transmission destination of image data. Note that the member count M is not limited to being a plural number, and may be just one person. In the case of the member count M being just one person, the group name may be the same as the user name.

In order to transmit the image data to destinations corresponding to the member count M, the transmission-side MFP sets the value of a variable n to "1" (S1406), and then transmits the image data in the same way as in the first embodiment to the user who is n-th in the list (S1407). After increasing the value of the variable n by 1 (S1408), if the value of the variable n is equal to or less than the member count M (S1409: NO), the transmission-side MFP then proceeds to step S1407. If the value of the variable n is greater than the member count M (step S1409: YES), the transmission-side MFP ends the processing.

With this structure, in an MFP shared by a plurality of users, when a user is sending the same image data to the respective home MFPs of a plurality of destination users, only a single designation is required by the user to designate the plurality of destinations. This achieves a high level of convenience in terms of reducing the effort to designate destinations, some examples of cases in which this is effective being when the user wishes to send blueprints to all members of a specific project in a company, or wishes to send the same drawings to a plurality of outside companies in order to receive quotes from them, or wishes to send a report to all clients in a specific category.

4. Fourth Embodiment

Next a description is given of an image communication system relating to a fourth embodiment of the present invention. While the image communication system of the fourth embodiment has basically the same structure as the image communication system of the first embodiment, it differs in that when the user transmits image data to himself/herself using his/her home MFP, a transmission method and destination designated in the individual address book are given priority over the processing method designated in the receiver settings. The following description focuses principally on the aspects that differ from the first embodiment.

Figure 16:
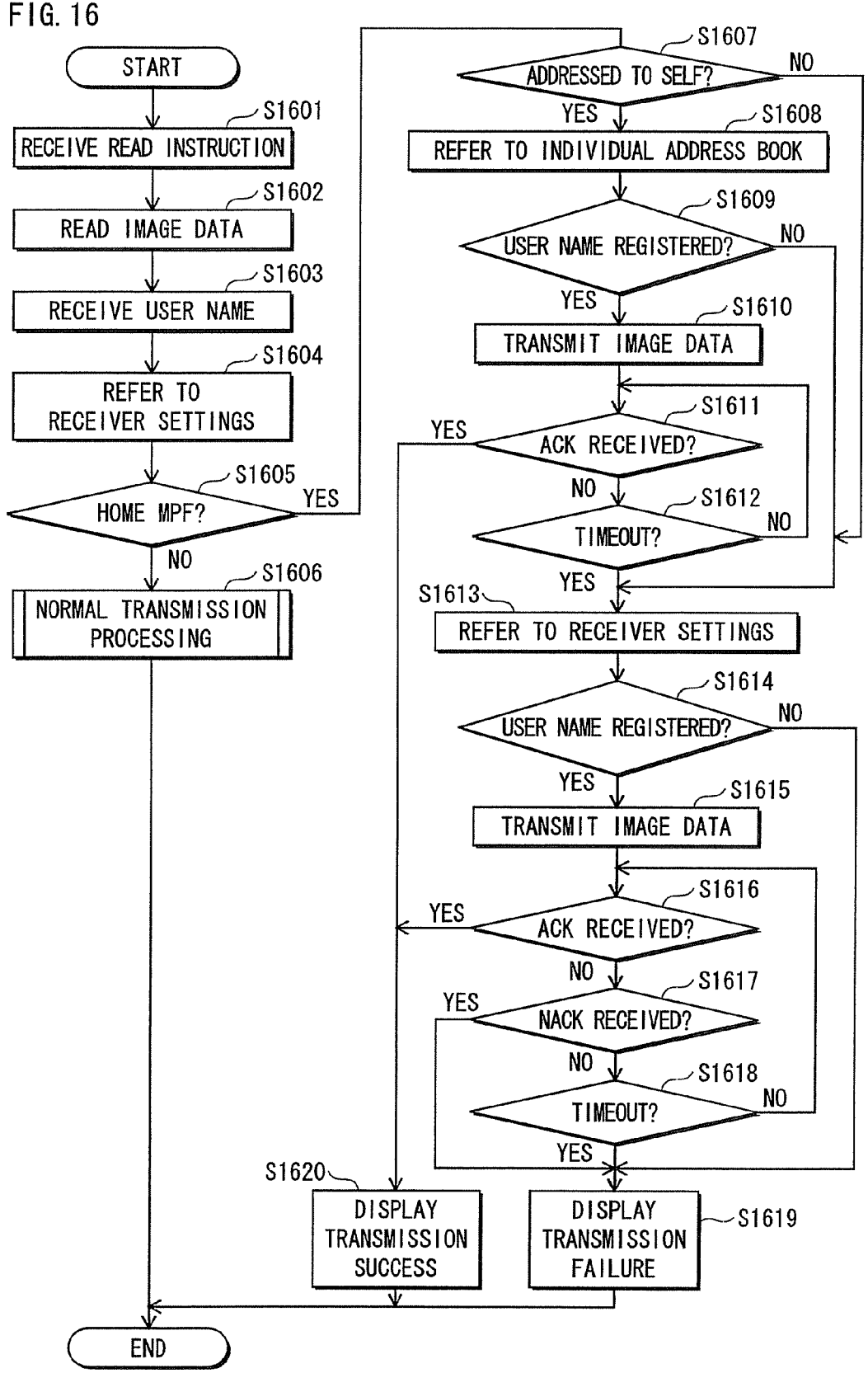
FIG. 16 is a flowchart showing operations of a transmission-side MFP in a fourth embodiment of the present invention.

Here, an example is given of person A, who uses the MFP 101 as his home MFP, transmitting image data to himself/ herself. As shown in FIG. 16, upon receiving a read instruction from the user (person A) to read image data (step S1601), the transmission-side MFP 101 reads the image data (S1602).

Next, upon receiving a user name that is the transmission destination of the image data from the user (S1603), the transmission-side MFP 101 refers to a home user list that is a list of users who use the transmission-side MFP 101 as a home MFP, to check whether the received user name is registered (S1604). If the user name is not registered in the home user list (S1605: NO), this means that it is another MFP that the image data is to be transmitted to, and therefore the transmission-side MFP 101 transmits the image data by executing the normal transmission processing shown in the first embodiment (S1606), and ends the processing.

Figure 17:
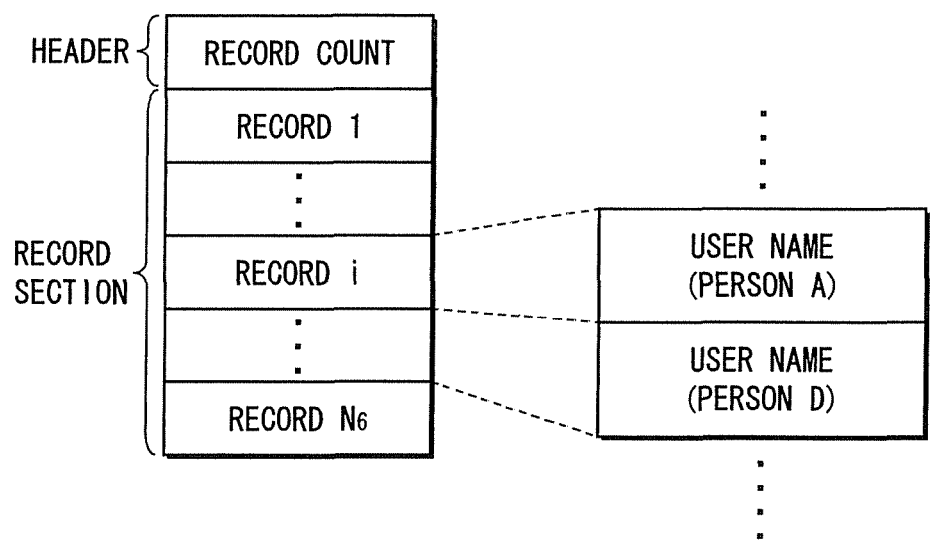
FIG. 17 shows the data structure of a home user list in the fourth embodiment of the present invention.

As shown in FIG. 17, the home user list 17 is composed of a header that stores a record count, and a record section that follows the header. The record section includes records equal in number to the record count, and stored in each record is a user name corresponding to a user who uses the transmission-side MFP 101 as a home MFP.

If the user name is registered in the home user list (S1605: YES), the transmission-side MFP 101 judges whether or not the user name received at step S1603 and the user name authenticated using the information in the flash card 202 (person A) are the same. If the two are the same, the transmission-side MFP 101 refers to the individual address book of the user (person A) to check whether the user name (person A) of the user himself/herself is registered (step S1607).

Figure 18:
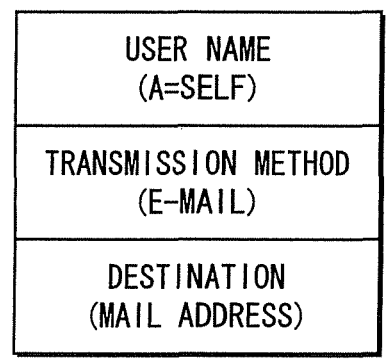
FIG. 18 shows the data structure of an individual address book in the fourth embodiment of the present invention.

If the user name is registered in the individual address book (S1609: YES), as shown in FIG. 18, the transmission-side MFP 101 uses the communication method (e.g., e-mail) corresponding to the user name (the user himself/herself) to transmit the image data to the destination (mail address) corresponding to the user name (the user himself/herself) (S1610) In other words, when it is determined that person A is giving an instruction to transmit image data to himself/ herself, the transmission-side MFP 101 refers to individual address book of person A with priority, and performs transmission according to the transmission method designated in the individual address book. If an ACK is then received from a predetermined mail server (S1611: YES), the transmission-side MFP 101 displays notification showing transmission success (S1620), and ends the processing.

When an ACK is not received (S1611: NO) and a timeout occurs (S1612: YES), or when person A is not registered in his own individual address book (S1609: NO), the transmission-side MFP 101 refers to the receiver settings 5 to check whether the user name is registered therein (S1613).

If the user name is registered in the receiver settings 5 (S1614: YES), as shown in FIG. 5, the transmission-side MFP 101 transmits the image data to the user (e.g., to a PC) using SMB transfer, for instance (S1615). If an ACK showing that the SMB transfer was successful is received from the PC (S1616: YES), the transmission-side MFP 101 displays notification of transmission success (S1620), and ends the processing.

If an ACK is not received (S1616: NO) and a NACK is received (S1617: YES) or a timeout occurs (S1618: YES), the transmission-side MFP 101 displays notification of transmission failure (S1619), and ends the processing.

Note that the judgment as to whether or not the image data is to be transmitted to the home user destination can be made by judging whether or not the user name is registered as a receiver in the receiver settings 5, instead of using the home user list 17. In this case step S1614 can be omitted.

5. Fifth Embodiment

Next a description is given of an image communication system of a fifth embodiment of the present invention. While the image communication system of the present embodiment has basically the same structure as the image communication system of the first embodiment, it differs in that in the case of communication through the reception-side MFP shown in the destination user list, notification is given that image data could not be transmitted. The following description focuses principally on the aspects that differ from the first embodiment.

Figure 19:
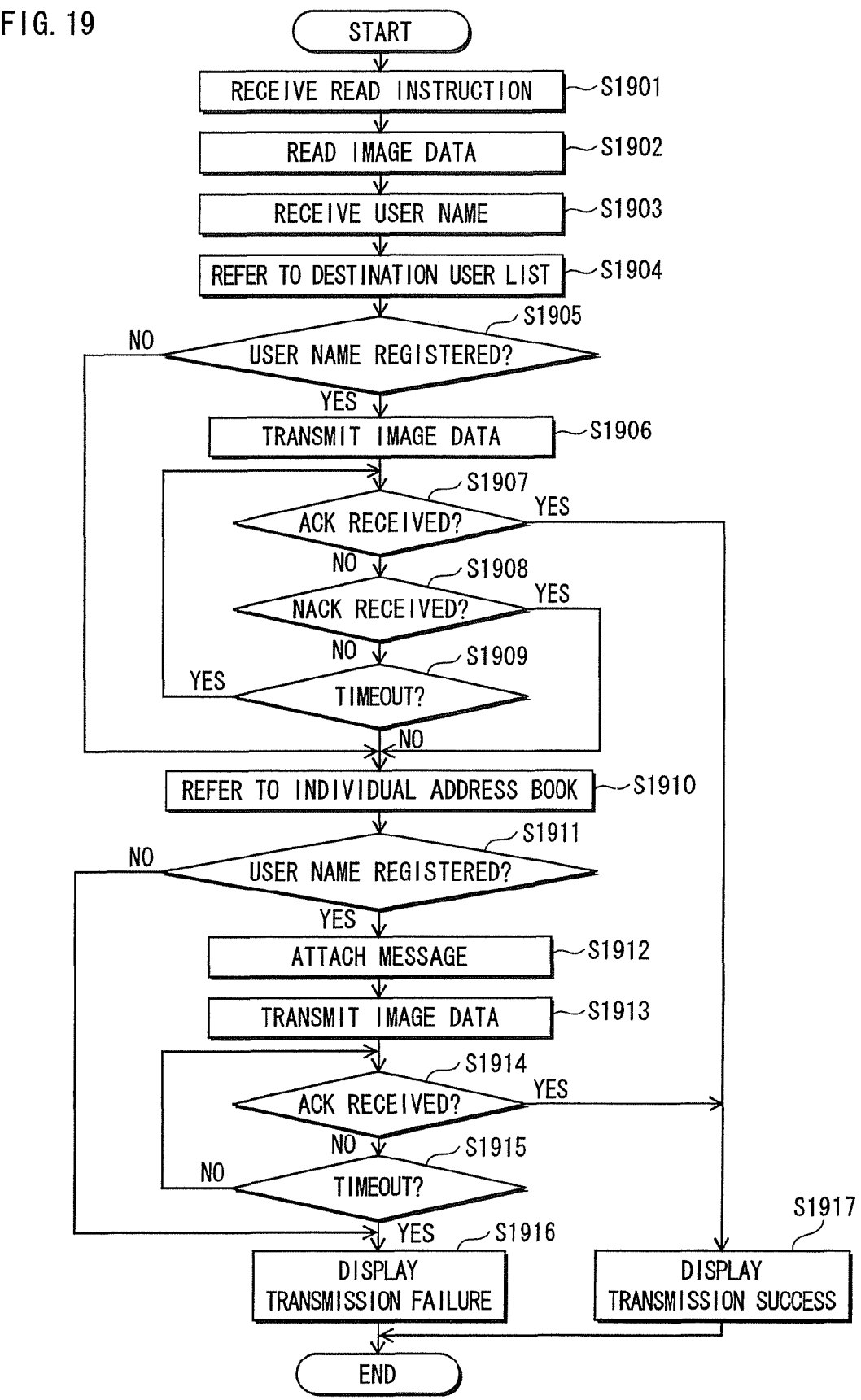
FIG. 19 is a flowchart showing operations of a transmission-side MFP in a fifth embodiment of the present invention.

Steps S1901 to S1909 in FIG. 19 are the same as in the first embodiment (steps S901 to S909 in FIG. 9), and therefore a description thereof is omitted. If transmission of image data using the destination user list fails, the transmission-side MFP refers to the individual address book to check whether the destination user name is registered (S1910).

If the user name is registered in the individual address book (S1911: YES), the transmission-side MFP attaches, to the image data, a transmission report showing that transmission of the image data based on the destination user list failed (S1912).

As shown in FIG. 20, information written in the transmission report 20 includes the sender, the destination, and information to the effect that the image data could not be sent to the home MFP designated in the destination user list.

The transmission-side MFP then transmits the image data to the destination corresponding to the user name (an e-mail address in the present example) using the communication method corresponding to the user name (S1913). If an ACK is then received from a predetermined mail server (S1914: YES), the transmission-side MFP displays notification showing transmission success on the operation panel 203 (S1917), and ends the processing.

When an ACK is not received (S1914: NO) and a timeout occurs (S1915: YES), the transmission-side MFP displays notification of transmission failure on the operation panel 203 (S1916), and ends the processing.

With the stated structure, abnormalities in communication via the home MFP can be notified to a user who receives the image data. Therefore, abnormalities in the home MFP can be discovered at an early stage, and can be fixed.

6. Sixth Embodiment

Next a description is given of an image communication system of a sixth embodiment of the present invention. While the image communication system of the first embodiment has basically the same structure as the image communication system of the first embodiment, it differs in that home MFP names and destination names relating to the destination user name are read from the destination user list and the individual address book and displayed, and the image data is transmitted in accordance with a selection by the user. The following description focuses principally on the aspects that differ from the first embodiment.

Figure 21:
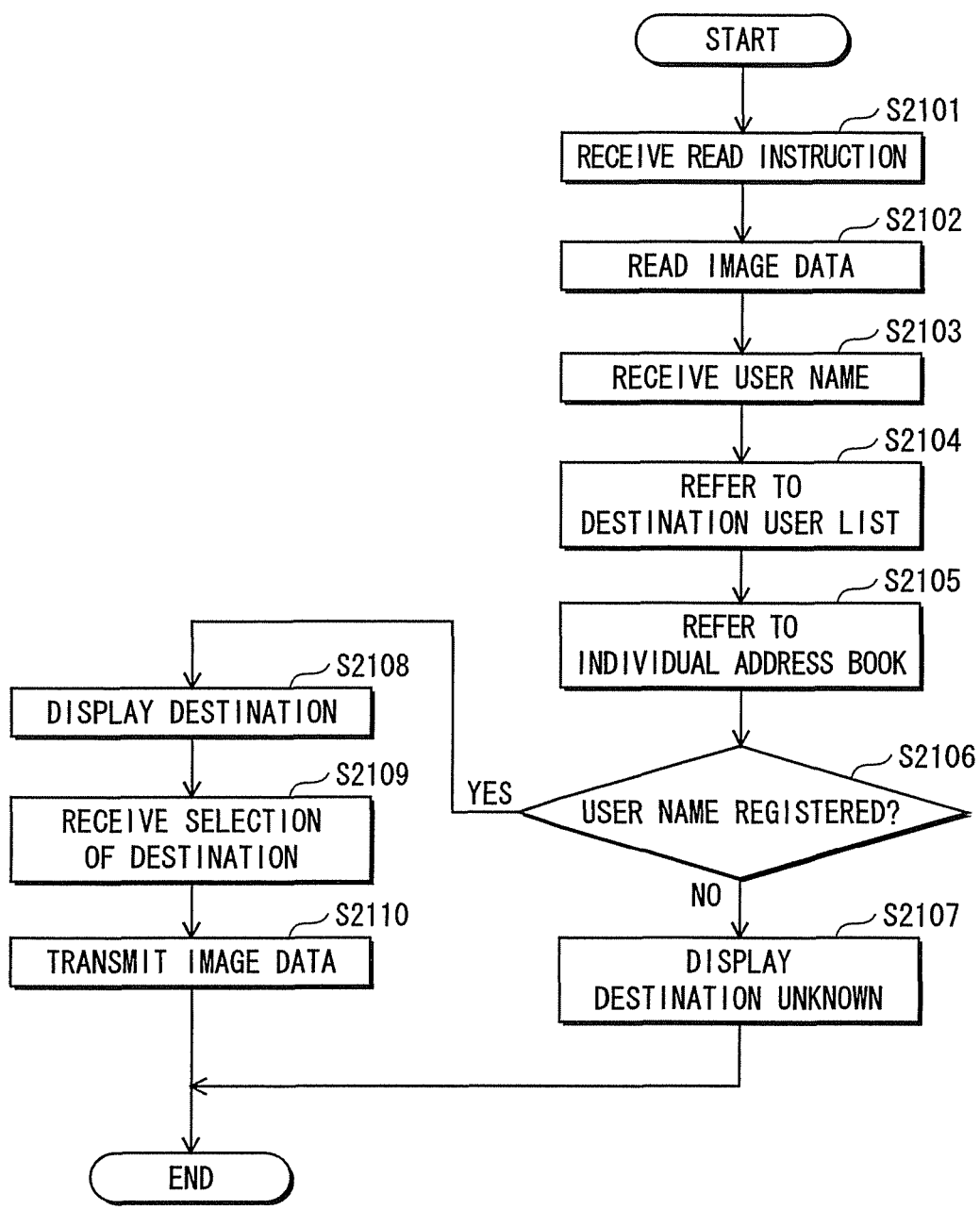
FIG. 21 is a flowchart showing operations by the transmission-side MFP in the sixth embodiment of the present invention.

As shown in FIG. 21, upon receiving a read instruction to read image data (S2101), the transmission-side MFP reads the image data (S2102).

The transmission-side MFP then receives a user name that is the transmission destination of the image data (S2103), refers to the destination user list (S2104), and also refers to the individual address book (S2105).

If the user name is not registered in either of the destination user list or the individual address book (S2106: NO), the transmission-side MFP displays notification that the destination is unknown (S2107), and ends the processing.

If the user name is registered in one or both of the destination user list and the individual address book (S2106: YES), the destination-side MFP displays the one or more destinations registered in the one or both of the home MFP and the individual address book (S2108).

Figure 22:
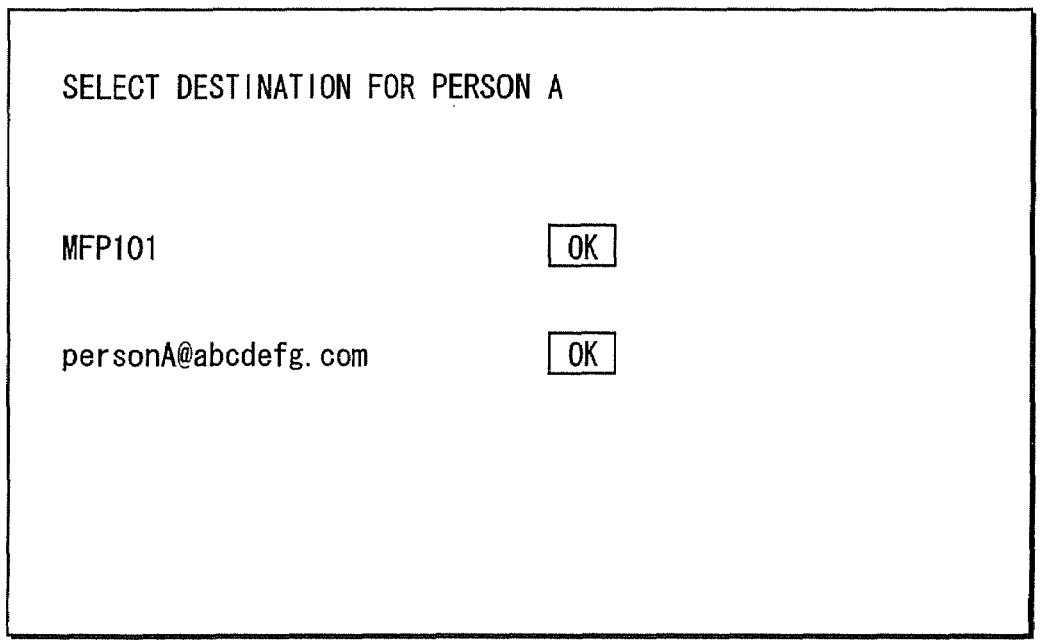
FIG. 22 shows an example of home MFPs and destinations that the transmission-side MFP displays in the sixth embodiment.

As shown in FIG. 22, in addition to the MFP 101 being displayed as the home MFP of person A, the e-mail address personA@abcdefg.com is also displayed as a destination. By one of the OK buttons displayed beside these being selected, a selection is made of either the home MFP or the destination.

Upon receiving the selection of one of the home MFP and the e-mail address (S2109), the transmission-side MFP transmits the image data to the selected one (S2110), and ends the processing.

With the stated structure, the effort for the user to designate the destination when transmitting image data is reduced, as well as the image data being able to be transmitted using communication method preferred by the user.

This kind of display can be performed using any of the described embodiments.

7. Modification Examples

Although the present invention has been described based on preferred embodiments, the present invention is by no means limited to the described embodiments, and the following are examples of possible modifications.

(1) Although not mentioned in the preferred embodiments, the MFPs 101 to 103 may use a common destination user list. This reduces the effort for the administrator when the administrator of the MFPs 101 to 103 is the same person.

Furthermore, when the administrator of each of the MFPs 101 to 103 is a different person and different destination lists are used, the administrators do not need to go to the effort to integrate the lists.

(2) The embodiments describe a case of using a home user list that is separate to the destination user list. However, the present invention is not limited to this structure. As an alternative, the home user may be registered in the destination user list, and when it is judged that a designated MFP is the MFP shown by the home MFP name, the destination user list may be used as the home user list. With this structure, the number of lists that the administrator of the transmission-side MFP has to administer is reduced, thus reducing the effort for the administrator.

(3) The embodiments describe a case of transmitting image data according to an individual address book if transmission of the image data according to the destination user list fails. However, the present invention is not limited to this structure, and the following is an example of an alternative structure.

Specifically, since the MFPs are connected to each other by both the Internet and the circuit switching network, if transmission of the image data via one of the communication networks fails, the image data may be transmitted via the other of the communication networks, and if transmissions via both communication networks fails, the image data may then be transmitted according to the individual address book.

This structure enables the image data to be received more reliably by the reception-side MFP, and therefore reduces the possibility that the image data will have to be re-transmitted.

In this sense, the effort for the user of the transmission-side MFP to designate the destination of the image data is reduced.

Note that in the case of transmission/reception between MFPs, the image data may first be sent by e-mail, if the transmission by e-mail fails, the image data may then be sent by facsimile. This structure enables image data having high picture quality to be received by the reception-side MFP.

(4) The preferred embodiments describe a case of only one destination being registered for a same user in each of the destination user lists and the individual address books. However, the present invention is not limited to this structure, and the following is an example of an alternative structure.

Specifically, a plurality of destinations and/or transmission methods may be registered with respect to a single user in each of the destination user list and the individual address book. In this case, the plurality of destinations and/or transmission methods are successively selected, and the image data transmitted to each selected one until transmission succeeds or until transmission fails to all destinations.

This structure enables the image data to be received more reliably at the destination, and therefore reduces the effort for the user of the transmission-side MFP to designate the destination of the image data.

(5) Although the embodiments describe a case of the image data being obtained by reading a document, the present invention is not limited to this structure. The following is an alternative structure.

Specifically, the image data that is transmitted may be image data that has been stored in advance in a storage apparatus. This image data that has been stored in advance may be image data obtained by reading a document, or may be image data received from another apparatus such as an MFP or a PC. The effects of the described procedures can be achieved regardless of the source of the image data.

(6) The described embodiments do not exclude each other. In other words, a plurality of the embodiments may be implemented simultaneously, one example of this being implementing the first embodiment and the second embodiment together.

As one more specific example, in the third embodiment, when the group name is judged not to be registered at step S1405 of FIG. 14, the individual address book may be referred to, and when the group name is registered in the in the individual address book, the image data may be transmitted to the destinations shown by the group name in the same way as steps S1406 to S1409. This may be realized by, for instance, using steps S1401 to S1409 in FIG. 14 instead of steps S901 to S906 in FIG. 9, and steps S1406 to S1409 instead of step S912.

(7) Although the embodiments describe a case of MFPs and PCs being connected via the Internet and a circuit switching network, the present invention is not limited to this structure, and the MFPs and PCs may be connected by another communication network. Furthermore, although the MFPs are described as being connected by both the Internet and a circuit switching network, the MFPs may instead be connected by only one type of communication network. The same effects can be obtained in any of these cases.

(8) Although not mentioned in the preferred embodiments, the present invention may be structured such that the transmission-side MFP transmits the image data with a highest possible picture quality. If, for instance, the highest picture quality that the transmission-side MFP can transmit is full color picture quality with a resolution of 600 dpi, the transmission-side MFP may transmit the image data with this highest picture quality.

If the transmission-side MFP transmits image data having low picture quality, even if high quality printing or the like has been set in the receiver settings of the reception-side MFP, in reality only low-quality image data can be output. On the other hand, if the transmission-side MFP transmits high-quality image data, the reception-side MFP can output the image data in accordance with the receiver settings, whether it be high picture quality or low picture quality indicated by the receiver settings.

Consequently, this structure is useful because the image data can be output with the picture quality desired by the user who uses the reception-side MFP as a home MFP. Furthermore, there is no need for the user transmitting the image data from the transmission-side MFP to give consideration to or check what kind of picture quality the user of the reception-side MFP desires. Therefore, the effort required to transmit image data is reduced.

(9) Although the processing method registered in the receiver settings was described as being image data transfer in the preferred embodiments, the present invention is not limited to this, and processing methods such as the following may be registered in the receiver settings.

For instance, the receiver settings may be set such that when image data is received, it is immediately output by 2 in 1 (combining two pages in one sheet) double-sided printing, or such that the file format of the image data is converted to PDF (portable document format), TIFF (tagged image file format), or JPEG (joint photographics experts group), and the resultant data stored in a storage apparatus. In this case, if the reception-side MFP has a storage area, such as that called a box, allocated to each user, the image data may be stored in the storage area of the particular user.

Furthermore, even if the designated processing method is transfer, the destination of the transfer is not limited to being a PC. The destination may instead be an apparatus such as another MFP, a mobile terminal or a mobile telephone. Furthermore, the communication path used for the transfer is not limited to being the Internet, and be a circuit switching network, for instance.

(10) Although in the preferred embodiments a description is given of a case in which communication is judged to have failed when a timeout occurs without an ACK being received from the destination such as a receiver-side MFP, a PC, or a mail server, the present invention is not limited to this structure. The following are alternative structures.

For instance, in the case of e-mail, it may be judged that communication has failed if a connection cannot be established with the mail server. In the case of a facsimile, it may be judged that communication has failed if a connection cannot be established to the line. Other methods may also be used to judge that communication has failed. The effects of the present invention can be obtained regardless of the method used to judge that communication has failed.

Furthermore, if it is possible to judge that communication has failed without waiting for a timeout, the processing time required to transmit image data can be reduced, and the convenience for the user can be improved.

(11) Although a case of the user being authenticated using a flash card and a card I/F is described in the preferred embodiments, the present invention is not limited to this structure. An example of an alternative is authenticating the user by receiving input of a login name and a password via the operation panel. Furthermore, the card I/F may be a contact type I/F or a non-contact type I/F.

(12) Although the second embodiment shows a case of the history information being referred to transmit the image data when transmission according to the destination user list fails, the present invention is not limited to this structure. An alternative structure is as follows.

Specifically, the image data may be transmitted according to the history information when transmission of the image data according to the destination user list has failed and transmission of the image data according to the individual address book has also failed. This enables image data to be transmitted more reliably.

In this case, the present invention may be structured such that if the destination in the individual address book and the destination in the history information are the same, the image data is not transmitted in duplicate to the same destination. Since this structure enables a quick judgment to be made that the image data cannot be transmitted to the destination desired by the user, the user can be notified of this quickly, and in addition unnecessary strain on the network.

(13) Although not mentioned in the preferred embodiments, the transmission-side MFP may receive input of data for registration in the individual address book via the operation panel, or may receive input of data for registration in the individual address book, or the entire individual address book, from another apparatus such as a PC using FTP (file transfer protocol) or the like. In particular, when the data of the individual address book can be registered more easily using another apparatus, the effort required to designate a destination for transmitting image data can be reduced.

(14) Although a case of displaying the home MFP name or the like corresponding to an input destination user name is described in the preferred embodiments, the present invention is not limited to this structure. The following is an alternative structure.

Instead of having the user of the transmission-side MFP input the destination user of the image data, the transmission-side MFP may refer to the destination user list and the individual address book, and display on the operation panel a list of destination users registered in at least one of these, together with one or both the home MFP and the destination of each destination user. The user is able to select from among the displayed information.

As shown in FIG. 23, a list of, from left to right, destination user names, home MFP names and destination names is displayed. According to manipulation of a scrollbar on the left hand side, other destination users that do not fit into the display can also be displayed. The user can select a home MFP, a destination, or the like by touching the desired one.

With this structure, the effort required for the user to designate the destination of the image data is reduced, and high operability is realized.

In FIG. 23, the user for which a destination name is not displayed is a user registered in the destination user list only, and not in the individual address book. The user for which a home MFP name is not displayed is a user registered in the individual address book only, and not in the destination user list, or a user whose home MFP is this MFP.

8. Description of Implementation Examples

As described, image transmission apparatus may include a history list that corresponds destination names with other apparatuses that the transmitter has transmitted image data to in the past, wherein when the judgment part judges that the transmission of the image data to the apparatus associated with destination name in the individual list has failed, the transmitter transmits the image data to the apparatus associated with the destination name in the history list. Accordingly, the image data can be sent even if the destination is not in the shared list or the individual list. This reduces the effort for the user to designate the destination.

Furthermore, when the received destination name is not in the shared list, the transmitter may transmit the image data to an apparatus corresponded with the destination name in one of a history list and the individual list administered by the user who instructed the transmission. Accordingly, instead of determining straight away that transmission is not possible when the destination name is not in the shared list, the individual list is referred to. This reduces the effort for the user to designate the destination of the image data.

Furthermore, the image transmission apparatus may further include: a notification receiver operable to receive reception notification from an image processing apparatus, the reception notification showing that the image data has been received, wherein the judgment part judges that the transmission has failed if a predetermined time passes without the notification receiver receiving the reception notification from when the image data is transmitted. Accordingly, the individual list is referred to when it cannot be confirmed that the image data has reached the destination. Therefore, the image data can be made more reliably to reach the destination.

Furthermore, the image transmission apparatus may further include: a display part operable to display the destination name together with one or both of (a) a name of the image processing apparatus in correspondence with the destination name in the shared list, and (b) a name of the apparatus corresponded with the destination name in the individual list, wherein the destination receiver receives the destination name by a selection being made of one of the displayed names. Accordingly, the user of the image transmission apparatus can send image data by simply selecting a displayed image processing apparatus or destination. This further reduces the effort necessary for the user to designate the destination.

Furthermore, the image transmission apparatus may further include: a notifier operable to, when transmission of the image data to the image processing apparatus corresponded with the destination name in the shared list is judged to have failed, attach, to the image data, notification that the transmission to the image processing apparatus corresponded with the destination name in the shared list failed. Accordingly, the person who received the image data can be notified that transmission to the image processing apparatus has failed, so that the person can be informed of the abnormality in the communication state of the image processing apparatus. Consequently, the image processing apparatus can be kept in a favorable communication state, and the effort to designate the destination of the image data that comes about when having to retransmit the image data can be reduced.

Furthermore, when the destination name received by the destination name receiver is identical to a name of the user who instructed the transmission of the image data, the transmitter may transmit the image data to the apparatus corresponded with the destination name in the individual list with preference over another list.

Furthermore, the image transmission program may cause the image processing apparatus to further perform the step of: storing a history list that corresponds destination names with other apparatuses that the image transmission apparatus has transmitted image data to in the past, wherein when, in the judgment step, it is judged that the transmission of the image data to the apparatus associated with destination name in the individual list has failed, the image data is transmitted to the apparatus associated with the destination name in the history list. Accordingly, the image data can be sent even if the destination is not in the shared list or the individual list. This reduces the effort for the user to designate the destination.

Furthermore, when the received destination name is not in the shared list, the image data may be transmitted to an apparatus corresponded with the destination name in one of a history list and the individual list administered by the user who instructed the transmission. Accordingly, instead of determining straight away that transmission is not possible when the destination name is not in the shared list, the individual list is referred to. This reduces the effort for the user to designate the destination of the image data.

Furthermore, the image transmission program may cause the image transmission apparatus to further perform the step of: receiving reception notification from an image processing apparatus, the reception notification showing that the image data has been received, wherein, in the judgment step, it may be judged that the transmission has failed if, in the notification receiving step, a predetermined time passes without the reception notification being received from when the image data is transmitted. Accordingly, the individual list is referred to when it cannot be confirmed that the image data has reached the destination. Therefore, the image data can be made more reliably to reach the destination.

Furthermore, the image transmission program may cause the image transmission apparatus to further perform the step of: displaying the destination name together with one or both of (a) a name of the image processing apparatus in correspondence with the destination name in the shared list, and (b) a name of the apparatus corresponded with the destination name in the individual list, wherein, in the destination name receiving step, the destination name is received by a selection being made of one of the displayed names. Accordingly, the user of the image transmission apparatus can send image data by simply selecting a displayed image processing apparatus or destination. This further reduces the effort necessary for the user to designate the destination.

Furthermore, the image transmission program may cause the image transmission apparatus to further perform the step of: when transmission of the image data to the image processing apparatus corresponded with the destination name in the shared list is judged to have failed, attaching, to the image data, notification that the transmission to the image processing apparatus corresponded with the destination name in the shared list failed. Accordingly, the person who received the image data can be notified that transmission to the image processing apparatus has failed, so that the person can be informed of the abnormality in the communication state of the image processing apparatus. Consequently, the image processing apparatus can be kept in a favorable communication state, and the effort to designate the destination of the image data that comes about when having to retransmit the image data can be reduced.

Furthermore, the image transmission program may cause the image transmission apparatus to judge whether or not the destination name received by the image processing apparatus in the destination name receiving step is identical to a name of the user who instructed the transmission of the image data, and when the received destination name and the name of the user who instructed the transmission of the image data are identical, cause the image transmission apparatus to transmit the image data to the apparatus corresponded with the destination name in the individual list with preference over another list.

Although the present invention has been fully described by way of examples with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. An image transmission apparatus that transmits image data to an image processing apparatus that processes the image data in accordance with a destination name of the image data, comprising:
    a transmitter operable to transmit image data in accordance with an instruction from a user;
    a destination name receiver operable to receive a destination name that is a name of a destination of the image data;
    a judgment part operable to judge whether or not the transmission of the image data succeeds or fails;
    a shared list that is shared by a plurality of users and that corresponds destination names with image processing apparatuses;
    a history list that corresponds destination names with other apparatuses that the transmitter has transmitted image data to in the past; and
    a plurality of individual lists, each of which is administered by a different one of the plurality of users, and that corresponds the destination names with apparatuses other than the image processing apparatuses corresponded therewith in the shared list,
    wherein, when the judgment part judges that transmission of the image data to the image processing apparatus corresponded with the destination name in the shared list has failed, the transmitter transmits the image data to an apparatus that is corresponded with the destination name in the individual list administered by the user who instructed the transmission;
    wherein when the judgment part judges that the transmission of the image data to the apparatus associated with destination name in the individual list has failed, the transmitter transmits the image data to the apparatus associated with the destination name in the history list.

2. The image transmission apparatus of claim 1, wherein when the received destination name is not in the shared list, the transmitter transmits the image data to an apparatus corresponded with the destination name in one of the history list and the individual list administered by the user who instructed the transmission.

3. The image transmission apparatus of claim 1, further comprising:
    a notification receiver operable to receive reception notification from an image processing apparatus, the reception notification showing that the image data has been received,
    wherein the judgment part judges that the transmission has failed if a predetermined time passes without the notification receiver receiving the reception notification from when the image data is transmitted.

4. The image transmission apparatus of claim 1, further comprising:
    a display part operable to display the destination name together with one or both of (a) a name of the image processing apparatus in correspondence with the destination name in the shared list, and (b) a name of the apparatus corresponded with the destination name in the individual list,
    wherein the destination receiver receives the destination name by a selection being made of one of the displayed names.

5. The image transmission apparatus of claim 1, further comprising:
    a notifier operable to, when transmission of the image data to the image processing apparatus corresponded with the destination name in the shared list is judged to have failed, attach, to the image data, notification that the transmission to the image processing apparatus corresponded with the destination name in the shared list failed.

6. The image transmission apparatus of claim 1, wherein when the destination name received by the destination name receiver is identical to a name of the user who instructed the transmission of the image data, the transmitter transmits the image data to the apparatus corresponded with the destination name in the individual list with preference over another list.

7. An image transmission apparatus used by a plurality of users, comprising:
    a transmitter operable to transmit image data in accordance with an instruction from a user;
    a notification receiver operable to receive reception notification from an image processing apparatus, the reception notification showing that the image data has been received;
    a destination name receiver operable to receive a destination name that is a name of a destination of the image data;
    a judgment part operable to judge whether or not the transmission of the image data succeeds or fails;
    a shared list that is shared by the plurality of users and that corresponds destination names with image processing apparatuses; and
    a history list that corresponds transfer destinations with the destination names, each transfer destination being an apparatus to which transmitted image data has been transferred in the past,
    wherein when the destination name receiver receives the destination name, the transmitter transmits the image data to the image processing apparatus corresponded with the received destination name in the shared list, and
    when the judgment part judges that the transmission has failed, the transmitter transmits the image data to the apparatus corresponded with the received destination name in the history list.

8. The image transmission apparatus of claim 7, further comprising:
    an individual list that corresponds the destination names with apparatuses other than the image processing apparatuses corresponded therewith in the shared list,
    wherein, when the received destination name is not in the shared list, the transmitter transmits the image data to an apparatus corresponded with the received destination name in one of the history list and the individual list of the user who instructed the transmission.

9. The image transmission apparatus of claim 7,
    wherein the judgment part judges that the transmission has failed if a lined time passes without the notification receiver receiving the reception notification from when the image data is transmitted.

10. The image transmission apparatus of claim 7, further comprising:
    a display part operable to display the destination name together with one or both of (a) a name of the image processing apparatus in correspondence with the destination name in the shared list, and (b) a name of the apparatus corresponded with the destination name in the individual list, wherein the destination receiver receives the destination name by a selection being made of one of the displayed names 11. The image transmission apparatus of claim 7, further comprising:
a notifier operable to, when transmission of the image data to the image processing apparatus corresponded with the destination name in the shared list is judged to have failed, attach, to the image data, notification that the transmission to the image processing apparatus corresponded with the destination name in the shared list failed.

12. A nontransitory computer readable medium encoded with an image transmission program being executed by an image transmission apparatus that transmits image data to an image processing apparatus that processes the image data in accordance with a destination name of the image data, the image transmission apparatus storing (a) a shared list that is shared by a plurality of users and that corresponds destination names with image processing apparatuses, (b) a plurality of individual lists, each of which is administered by a different one of the plurality of users and that corresponds the destination names with apparatuses other than the image processing apparatuses corresponded therewith in the shared list, and (c) a history list that corresponds destination names with other apparatuses that the image transmission apparatus has transmitted image data to in the past, the image transmission program causing the image transmission apparatus to perform the steps of:
receiving a destination name that is a name of a destination of image data;
transmitting the image data in accordance with an instruction from a user; and
judging whether or not the transmission of the image data succeeds or fails,
wherein, when it is judged that transmission of the image data to the image processing apparatus corresponded with the destination name in the shared list has failed, the image data is transmitted to an apparatus that is corresponded with the destination name in the individual list administered by the user who instructed the transmission;
wherein when, in the judgment step, it is judged that the transmission of the image data to the apparatus associated with destination name in the individual list has failed, the image data is transmitted to the apparatus associated with the destination name in the history list.

13. The nontransitory computer readable medium of claim 12, wherein
when the received destination name is not in the shared list, the image data is transmitted to an apparatus corresponded with the destination name in one of the history list and the individual list administered by the user who instructed the transmission.

14. The nontransitory computer readable medium of claim 12, causing the image transmission apparatus to further perform the step of:
receiving reception notification from an image processing apparatus, the reception notification showing that the image data has been received,
wherein, in the judgment step, it is judged that the transmission has failed if, in the notification receiving step, a predetermined time passes without the reception notification being received from when the image data is transmitted.

15. The nontransitory computer readable medium of claim 12, causing the image transmission apparatus to further perform the step of:
displaying the destination name together with one or both of (a) a name of the image processing apparatus in correspondence with the destination name in the shared list, and (b) a name of the apparatus corresponded with the destination name in the individual list,
wherein, in the destination name receiving step, the destination name is received by a selection being made of one of the displayed names.

16. The nontransitory computer readable medium of claim 12, causing the image transmission apparatus to further perform the step of:
when transmission of the image data to the image processing apparatus corresponded with the destination name in the shared list is judged to have failed, attaching, to the image data, notification that the transmission to the image processing apparatus corresponded with the destination name in the shared list failed.

17. The nontransitory computer readable medium of claim 12, causing the image transmission apparatus to judge whether or not the destination name received by the image processing apparatus in the destination name receiving step is identical to a name of the user who instructed the transmission of the image data, and when the received destination name and the name of the user who instructed the transmission of the image data are identical, causing the image transmission apparatus to transmit the image data to the apparatus corresponded with the destination name in the individual list with preference over another list.

18. A nontransitory computer readable medium encoded with an image transmission program being executed by an image transmission apparatus that is used by a plurality of users, the image processing apparatus storing a shared list that is shared by the plurality of users and that corresponds destination names with image processing apparatuses, the image transmission program causing the image transmission apparatus to perform the steps of:
receiving a destination name that is a name of a destination of image data;
transmitting the image data in accordance with an instruction from a user;
receiving reception notification from an image processing apparatus, the reception notification showing that the image data has been received, and
judging whether or not the transmission of the image data succeeds or fails,
wherein, the image transmission apparatus further stores a history list that corresponds transfer destinations with the destination names, each transfer destination being an apparatus to which transmitted image data has been transferred in the past,
when the destination name is received in the destination name receiving step, in the transmitting step, the image data is transmitted to the image processing apparatus corresponded with the received destination name in the shared list, and
when, in the judgment step it is judged that the transmission has failed, in the transmission step the image data is transmitted to the apparatus corresponded with the received destination name in the history list.

19. The image transmission program of claim 18, wherein the image transmission apparatus further stores an individual list that corresponds the destination names with apparatuses other than the image processing apparatuses corresponded therewith in the shared list, wherein when the received destination name is not in the shared list, in the transmission step, the image data is transmitted to an apparatus corresponded with the received destination name in one of the history list and the individual list of the user who instructed the transmission.

20. The image transmission program of claim 18, wherein, in the judgment step, it is judged that the transmission has failed if a predetermined time passes without, in the notification receiving step, the reception notification being received from when the image data is transmitted.

21. The image transmission program of claim 18, causing the image transmission apparatus to further perform the step of:

displaying the destination name together with one or both of (a) a name of the image processing apparatus in correspondence with the destination name in the shared list, and (b) a name of the apparatus corresponded with the destination name in the individual list, wherein, in the destination name receiving step, the destination name is received by a selection being made of one of the displayed names.

22. The image transmission program of claim 18, causing the image transmission apparatus to further perform the step of:

when transmission of the image data to the image processing apparatus corresponded with the destination name in the shared list is judged to have failed, attaching, to the image data, notification that the transmission to the image processing apparatus corresponded with the destination name in the shared list failed.

* * * * *